(12) United States Patent
Sharma et al.

(10) Patent No.: US 11,975,954 B2
(45) Date of Patent: May 7, 2024

(54) AUTONOMOUS VEHICLES MANAGEMENT IN AN OPERATING ENVIRONMENT

(71) Applicant: Rapyuta Robotics Co., Ltd., Tokyo (JP)

(72) Inventors: Abhishek Sharma, Tokyo (JP); Veeraj S Khokale, Tokyo (JP); Dale Koenig, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 126 days.

(21) Appl. No.: 17/539,223

(22) Filed: Dec. 1, 2021

(65) Prior Publication Data
US 2022/0234872 A1 Jul. 28, 2022

Related U.S. Application Data

(60) Provisional application No. 63/140,299, filed on Jan. 22, 2021.

(51) Int. Cl.
| | |
|---|---|
| *B66F 9/06* | (2006.01) |
| *G05D 1/00* | (2006.01) |
| *G05D 1/02* | (2020.01) |

(52) U.S. Cl.
CPC .......... *B66F 9/063* (2013.01); *G05D 1/0214* (2013.01); *G05D 1/0274* (2013.01);
(Continued)

(58) Field of Classification Search
CPC .... B66F 9/063; G05D 1/0214; G05D 1/0274; G05D 1/0289; G05D 1/0291; G05D 2201/0216
See application file for complete search history.

(56) References Cited

U.S. PATENT DOCUMENTS

| | | | |
|---|---|---|---|
| 2017/0017236 A1* | 1/2017 | Song | G08G 1/164 |
| 2018/0211347 A1 | 7/2018 | Chen et al. | |

(Continued)

FOREIGN PATENT DOCUMENTS

| | | |
|---|---|---|
| JP | 2020-505293 A | 2/2020 |
| WO | WO 2019/116643 A1 | 6/2019 |

OTHER PUBLICATIONS

European Search Report and Search Opinion dated Jun. 23, 2022, in the European Application No. 22152597.5.

*Primary Examiner* — Kenneth J Malkowski
*Assistant Examiner* — Carville Albert Hollingsworth, IV
(74) *Attorney, Agent, or Firm* — Trupti P. Joshi

(57) ABSTRACT

The disclosure generally relates to method and system for autonomous vehicles management in an operating environment. The method may include sending a route plan in response to a request received by an autonomous vehicle from amongst a plurality of autonomous vehicles in an operating environment including one or more devices, wherein the one or more device comprises device or device space. The method may further include categorizing the route plan into path segments, the path segments including a first path segment including one or more nodes from the plurality of nodes being inside a device zone of the one or more devices and a second path segment including one or more nodes from the plurality of nodes being outside the device zone of the one or more devices. The method may further include determining a type of path segment from the categorized path segments for each of the node in the navigation segment and annotating the first node of the first path segment with a second precondition based on determination of a destination node from the one or more nodes and the second precondition includes performing a hard lock (Continued)

action of the first device for the autonomous vehicle traversing the first path segment to the destination node.

21 Claims, 15 Drawing Sheets

(52) U.S. Cl.
CPC ......... *G05D 1/0289* (2013.01); *G05D 1/0291* (2013.01); *G05D 2201/0216* (2013.01)

(56) References Cited

U.S. PATENT DOCUMENTS

| | | |
|---|---|---|
| 2019/0146509 A1 | 5/2019 | Dean |
| 2020/0012284 A1* | 1/2020 | Morita ................. G05D 1/0016 |
| 2020/0394405 A1 | 12/2020 | Fukui |

\* cited by examiner

AUTONOMOUS VEHICLES MANAGEMENT IN AN OPERATING ENVIRONMENT

CROSS-REFERENCE TO RELATED APPLICATIONS

The present application claims the benefit of priority from U.S. Provisional Application No. 63/140,299, filed Jan. 22, 2021, the contents of which are hereby incorporated by reference herein in its entirety.

TECHNICAL FIELD

The disclosure herein generally relates to autonomous vehicles, more particularly to, autonomous vehicles management in an operating environment.

BACKGROUND

Existing warehouses involve the task of picking and dropping an object, like palette, using a single autonomous vehicle, for example, a robot in a device like a single rack of a warehouse. The single rack is utilized only if the robot needs to perform any functionality within the rack. The problem gets further complex if there are multiple devices, like multiple mobile racks, vertical conveyors, sheet shutters, temporary spaces, charging stations etc. and the heterogeneous autonomous vehicles continue to perform their functions, in an operating environment, like a warehouse.

SUMMARY OF THE INVENTION

The accompanying drawings, which are incorporated in and constitute a part of this disclosure, illustrate exemplary embodiments and, together with the description, serve to explain the disclosed principles.

Embodiments of the present disclosure present technological improvements as solutions to one or more technical problems recognized by the inventors in conventional systems. For example, in one embodiment, a processor implemented method for autonomous vehicles management in an operating environment is provided. The method includes sending a route plan, in response to a request received by an autonomous vehicle from amongst a plurality of autonomous vehicles, in an operating environment comprising one or more devices or one or more device spaces, and wherein the route plan comprises a plurality of nodes. The method further includes categorizing the route plan into path segments, the path segments comprising a first path segment including one or more nodes from the plurality of nodes being inside a device zone of the one or more devices and a second path segment including one or more nodes from the plurality of nodes being outside the device zone of the one or more devices. The method further includes determining a type of path segment from the categorized path segments for each of the node in the route plan, wherein the type of determined path segment being the first path segment comprising a first device from the one or more devices, wherein the first device is mapped to a first node from the one or more nodes of the first path segment, and wherein the first node is assigned a first precondition comprising an action to enter the device zone of the first device. The method further includes annotating the first node of the first path segment with a second precondition based on determination of a destination node from the one or more nodes, wherein the second precondition comprises performing a hard lock action of the first device for the autonomous vehicle traversing the first path segment to the destination node.

In another embodiment, a system for autonomous vehicles management in an operating environment is provided. The system includes a memory storing instructions, and one or more hardware processors coupled to the memory via the one or more communication interfaces. The one or more hardware processors are configured by the instructions to send a route plan, in response to a request received by an autonomous vehicle from amongst a plurality of autonomous vehicles, in an operating environment comprising one or more devices or one or more device spaces, and wherein the route plan comprises a plurality of nodes. The system is further configured by the instructions to categorize the route plan into path segments, the path segments comprising a first path segment including one or more nodes from the plurality of nodes being inside a device zone of the one or more devices and a second path segment including one or more nodes from the plurality of nodes being outside the device zone of the one or more devices. The system is further configured by the instructions to determine a type of path segment from the categorized path segments for each of the node from the plurality of nodes, wherein the type of determined path segment being the first path segment comprising a first device from the one or more devices, wherein the first device is mapped to a first node from the one or more nodes of the first path segment, and wherein the first node is assigned a first precondition comprising an action to enter the device zone of the first device. The system is further configured by the instructions to annotate the first node of the first path segment with a second precondition based on determination of a destination node, wherein the second precondition comprises performing a hard lock action of the first device for the autonomous vehicle traversing the first path segment to the destination node.

In yet another embodiment, one or more non-transitory machine-readable information storage mediums are provided. Said one or more non-transitory machine-readable information storage mediums comprises one or more instructions which when executed by one or more hardware processors causes sending a route plan, in response to a request received by an autonomous vehicle from amongst a plurality of autonomous vehicles, in an operating environment comprising one or more devices or one or more device spaces, and wherein the route plan comprises a plurality of nodes. The method further includes categorizing the route plan into path segments, the path segments comprising a first path segment including one or more nodes from the plurality of nodes being inside a device zone of the one or more devices and a second path segment including one or more nodes from the plurality of nodes being outside the device zone of the one or more devices. The method further includes determining a type of path segment from the categorized path segments for each of the node from the plurality of nodes, wherein the type of determined path segment being the first path segment comprising a first device from the one or more devices, wherein the first device is mapped to a first node from the one or more nodes of the first path segment, and wherein the first node is assigned a first precondition comprising an action to enter the device zone of the first device. The method further includes annotating the first node of the first path segment with a second precondition based on determination of a destination node from the one or more nodes, wherein the second precondition comprises performing a hard lock action of the first device for the autonomous vehicle traversing the first path segment to the destination node.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
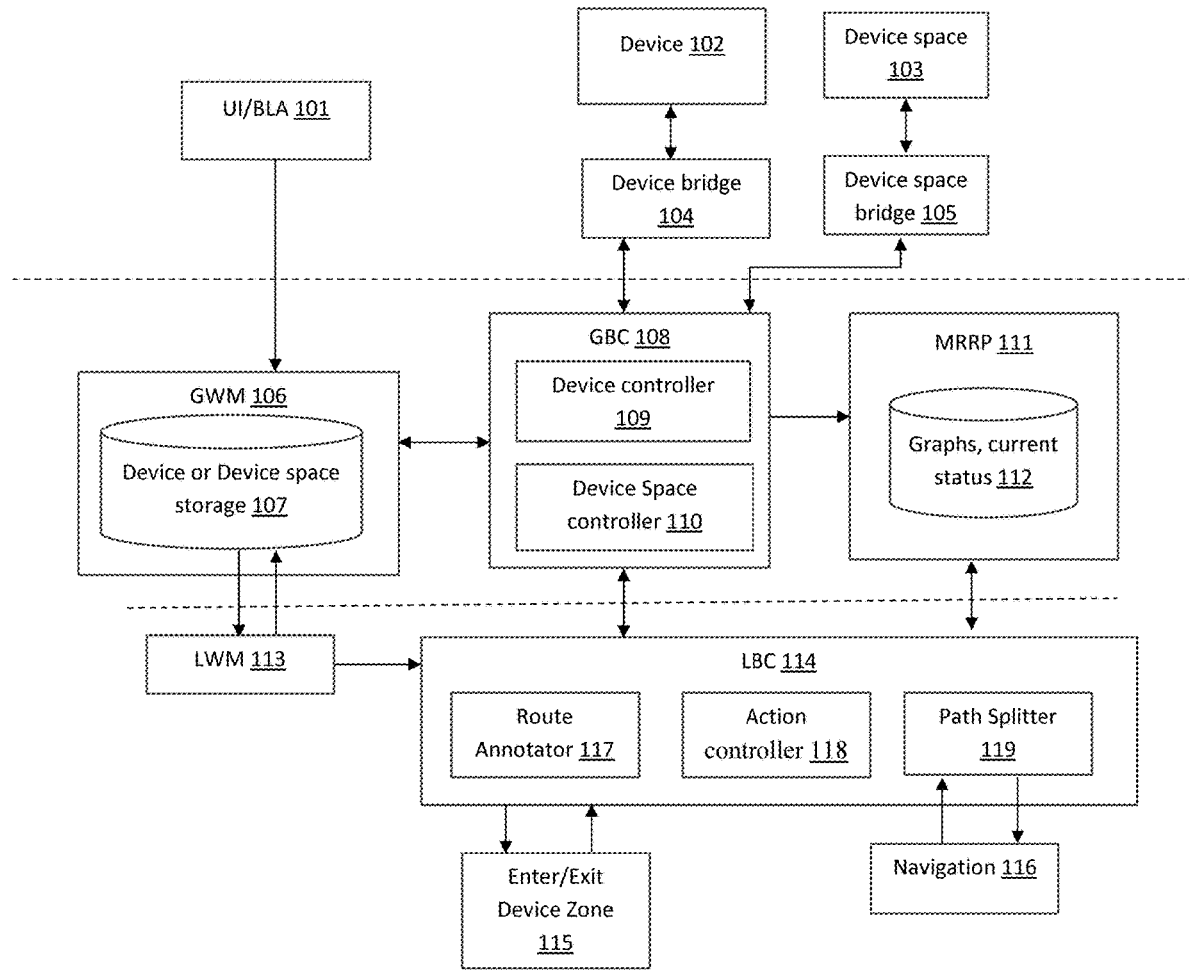
FIG. 1 is a block diagram illustrating a computer-implemented system for autonomous vehicles management in an operating environment, in accordance with some embodiments of the present disclosure.

Exemplary embodiments are described with reference to the accompanying drawings. In the figures, the leftmost digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments. It is intended that the following detailed description be considered as exemplary only, with the true scope and spirit being indicated by the claims (when included in the specification).

Embodiments of the present disclosure provide a method and system for autonomous vehicles management in an operating environment. Managing and handling a plurality of autonomous vehicles, for example a plurality of heterogenous mobile robots, in a collaborative way with multiple heterogeneous devices in an operating environment including multiple levels is disclosed. The present disclosure provides a method and system facilitating collaboration between a multi robot route planner and a device controller and takes security precautions to ensure the technique allows multiple autonomous vehicles to navigate, with no deadlocks, no waiting for each other amongst multiple heterogeneous devices. The heterogeneous devices cause particular challenges as the autonomous vehicles need to navigate into the passages of these heterogeneous devices or device space and need to enter and exit passageways in a warehouse. The functionalities of present disclosure include an overlap of navigation, route planning, and device control. The system is extendible to any device or device space or area around a device in an operating environment like a warehouse overlapping with the navigation zone of a plurality of vehicles. Embodiments of techniques to manage heterogeneous devices and autonomous vehicles in an operating environment is further described in detail with respect to FIG. 1-13.

A detailed description of the above-described system and method for multi-robot route planning is shown with respect to illustrations represented with reference to FIGS. 1 through 13.

Referring now to the drawings, and more particularly to FIGS. 1 through 13, where similar reference characters denote corresponding features consistently throughout the figures, there are shown preferred embodiments and these embodiments are described in the context of the following exemplary system and/or method.

FIG. 1 is a block diagram illustrating a computer-implemented system for autonomous vehicles management in an operating environment, in accordance with some embodiment of the present disclosure. In one embodiment, the system 100 may include three levels of interface. As shown in FIG. 1, the three levels of interface may include Level 1—User Interface (UI), Business Logic Application (BLA) 101. Level 2 may include one or more server level components, namely, Global World Model (GWM) 106, Global Behavior Controller (GBC) 108 and MRRP (Multi-Robot Route Planner) 111. Level 3 includes autonomous vehicle level components—LBC 114 that runs on a plurality of heterogeneous autonomous vehicles and LWM 113. The system 100 is further described with respect to each of the aforementioned components.

In one embodiment, the BLA 101 may include one or more functionalities such as computing logic for one or more devices like vertical conveyors, mobile racks, vertical conveyor bridge which communicates with a server layer, mobile rack bridge which also communicates with the server layer. The BLA may also include one or more functionalities such as computing logic for device space and area around a device. The system controls various devices and device space available in a warehouse. Throughout the disclosure, the term device refers to a physical entity and device space refers to a non-physical entity. For example, device refers to any external devices like material handling equipment or a machine in a warehouse premise that needs to be automatically controlled and monitored by the system 100. And, the term device space refers to any temporary devices or spaces or regions created in the warehouse for loading and unloading items, charging points or other similar stationary points, created in the warehouse, which may or may not be area around a device. The temporary spaces are open spaces marked with line controllers or columns and specific location within the area are marked for loading and unloading items. The temporary spaces may be created in the same premise as the device or area around the device. As suggested by the name, the space created for loading and unloading items may be temporary and may change depending on a requirement in the warehouse. The temporary spaces marked by lines and columns and be considered a boundary where an autonomous vehicle operates. The UI/BLA 101 is a stack UI provided by the system 100 or a custom Business Logic Application that may invoke a web API, for example, REST APIs of the GWM 106 to register and update one or more devices or device space to the system 100. GWM 106 also acts as a bookkeeper of system 100. The GWM 106 stores information related to one or more devices or device space in a persistent storage 107 and exposes the APIs to facilitate access and updates. The GWM 106 also broadcasts current versions of one or more devices via a ROS topic. Whenever a change is made to the one or more device information, GWM 106 bumps up the version and broadcasts again to the other autonomous vehicles. The LWM 113 and GBC 108 react to this version change by pulling in the most recent device or device space representation in a warehouse.

In one embodiment, the GBC 108 facilitates operating on optimizing task assignment and tracking of the plurality of autonomous vehicles. In another embodiment, GBC 108 may also include independent controller nodes for device and device space (109, 110) that trigger actions on the one or more devices or device space (e.g., mobile rack movement to open a specific passage or a temporary space) as well as access controllers for physical access to the devices. For example, each controller node inside GBC 108 may include a one-to-one mapping with the physical instance of the respective external device or device space in the warehouse. For example, a mobile rack controller node has one to one mapping with a mobile rack instance in the warehouse. For example, the mobile rack controller node updates mobile rack status and triggers mobile rack movement to open a specific passage, communicates with the MRRP 111 to enable or disable required sets of nodes, manages robots access to the respective device 102 or device space 103 via granting and releasing locks, namely soft locks and hard locks via device bridge 104 and device space bridge 105 respectively. The device controller 109 or device space controller 110 updates the status of the device and device space and manages an autonomous vehicle's access to the respective device 102 or device space 103 via granting and releasing locks.

In one embodiment, MRRP 111 optimizes global planning of routes for the plurality of autonomous vehicles in an operating environment, like a warehouse. MRRP 111 also plans routes based on a discrete representation of a map as a graph with connected plurality of nodes and edges. The graph may be manually or auto-generated using the stack UI/BLA 101. Each of the plurality of autonomous vehicles runs LWM 113 instances that caches complete status of an autonomous vehicle from the plurality of autonomous vehicles in an in-memory store and broadcasts to other autonomous vehicles be consumed by other LWM's and GWM on the operating environment. The LWM 113 also synchronizes the graph and one or more devices or device space information between the GWM 106 and the LBC 114. The LBC 114 controls actions taken by the autonomous vehicle and coordinates with MRRP 111 to get appropriate routes, with other autonomous vehicles to efficiently execute the routes and with the GBC 108 one or more devices controller nodes or device space nodes/line controller nodes (109, 110, etc.) in case of temporary spaces to synchronize access to respective one or more devices. Route plans received from MRRP 111 are processed by a route annotator 117 to provide appropriate actions and preconditions along the route to the plurality of autonomous vehicles. For example, an autonomous vehicle like a robot navigates to a destination, the LBC 114 requests a navigation route from the MRRP 111 to the destination. The MRRP 111 sends the navigation route to the robot based on the request received. The navigation route includes a plurality of nodes connected and leading to the destination. The route may include multiple devices mapped to a node from the plurality of nodes to follow the navigation route via one or more devices to reach the destination node. The LBC 114 first annotates the plurality of nodes in the navigation route with either actions, for example, a hard lock, a soft lock requests, or Enter/Exit device zone 115 actions. The action is initiated when the autonomous vehicle passes a node annotated with the aforementioned one or more actions. The LBC 114 also annotates the plurality of nodes in the navigation route with precondition. The precondition on the node is a constraint that needs to be satisfied before the autonomous vehicle navigates to a next node. For example, acquiring a hard lock or soft-lock & completing the enter/exit device zone action before/after, entering/exiting a device are possible preconditions in the present context.

In one embodiment, each of the nodes is annotated in the choose navigation route and a path categorizer 119 splits the path into path segments on the preconditions and initiates navigation based on the precondition. The categorized path segment initiates the annotated action via action controller 118 when the autonomous vehicle traverses each of the nodes in the path segment. On completion of an action, the system removes the associated precondition & updates the path to be navigated. One or more functionalities of the system 100 and components thereof, is further explained in detail with respect to FIGS. 2-13.

Figure 2A:
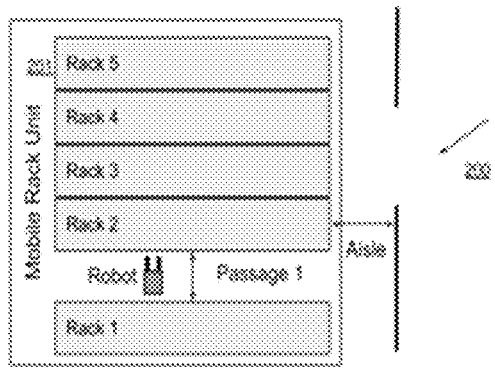
FIGS. 2A-2C illustrates device and device space with open passages, in accordance with some embodiments of the present disclosure.
Figure 2B:
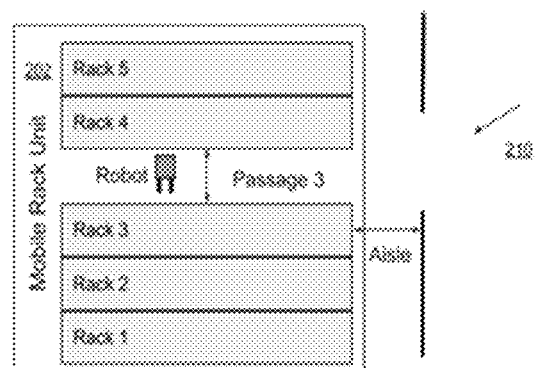
Figure 2C:
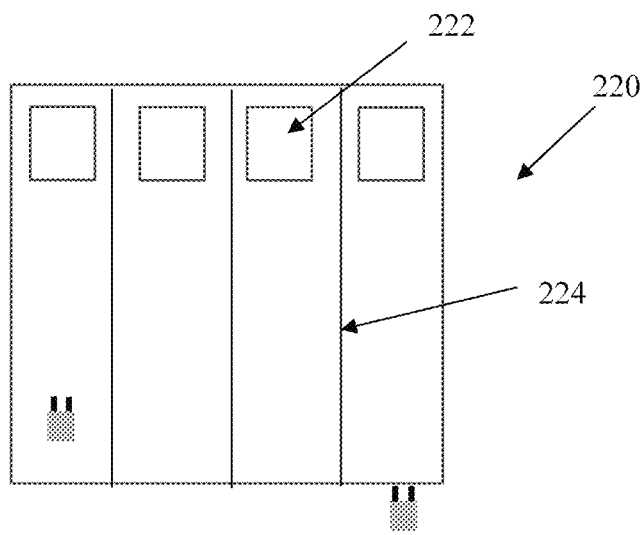

FIG. 2A-2C illustrates device and device space with open passages, in accordance with some embodiments of the present disclosure. In one embodiment, the one or more devices may include a device system 200. As shown in FIG. 2A, the device system 200 includes a mobile rack unit 201 having multiple mobile racks, for example, five mobile racks, rack 1, rack 2, rack 3, rack 4 and rack 5 with an open passage. The five mobile racks are used to increase the storage capacity of a warehouse at the cost of order processing speed. The mobile racks are installed on mobile bases which can slide smoothly on rails, fixed to the floor. As shown in FIG. 2A, the mobile rack unit 201 including the five mobile racks are arranged next to another mobile rack unit 210 containing mobile rack unit 202 as shown in FIG.

2B. The five mobile racks in mobile rack unit 210 and 202 are next to one another and each of the racks are arranged with a single open passage between any two consecutive racks, for example, as shown in FIG. 2A between rack 1 and rack 2 and as shown in FIG. 2B between rack 3 and rack 4. The mobile rack unit 201 is equipped with motors and electronic control, to operate the open passages on demand. Alternatively, the mobile rack unit 201 may include sensor suites that can detect the presence of robots or humans within the open passages and can reject requests to change configuration when it's not safe to do so. In some warehouses, multiple mobile racks can be installed next to each other to further save on space. In such configurations, each mobile rack operates as an individual entity and the presence of another mobile rack in the proximity doesn't influence its operations. FIG. 2C illustrates a device space arrangement 220 for inbound item picking in a warehouse. For example, the device space may be a temporary space created around a device or open space in a warehouse. The temporary spaces may include a stack of nestainer 222 to place or pick an item/loading and unloading of items. The device space is divided by line indicators or columns 224 which serves as boundaries for a robot operating in the area. The various arrangements of device and device space in FIG. 2A-2C is only illustrative and is not considered to be limiting within the scope of the present disclosure.

Figure 3:
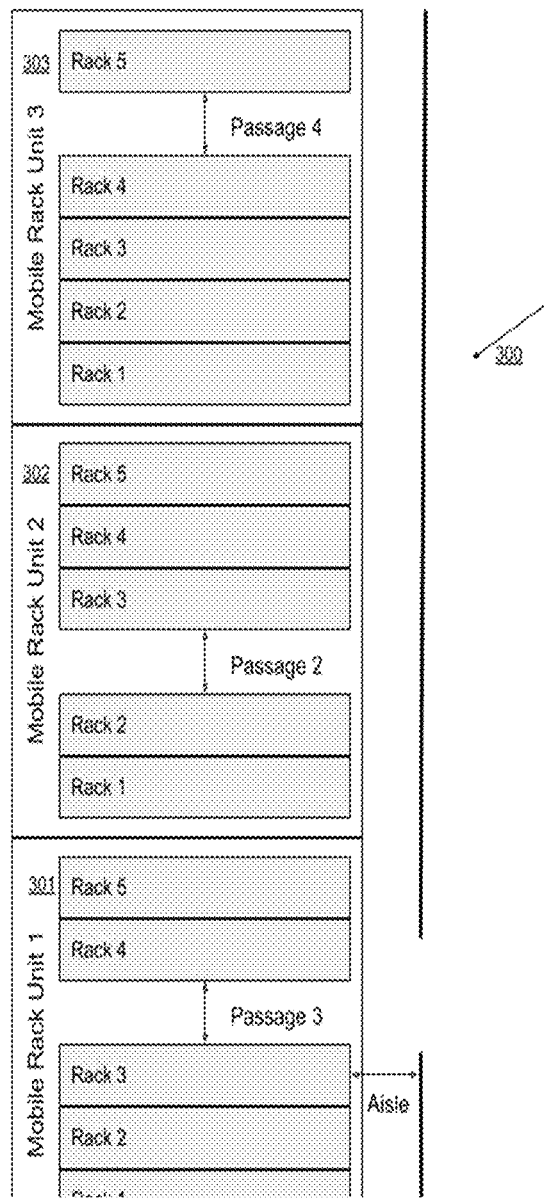
FIG. 3 illustrates devices arranged next to each other, in accordance with some embodiments of the present disclosure.

FIG. 3 illustrates devices arranged next to each other, in accordance with some embodiments of the present disclosure. In one embodiment, a device for example, mobile rack unit 301, mobile rack unit 302 and mobile rack unit 303 are arranged next to each other as shown in 300 of FIG. 3 with a single passage between the racks. Each of the mobile rack units contains multiple racks for example, five racks, namely, rack 1, rack 2, rack 3, rack 4 and rack 5. For each mobile rack broadcasts the current state of the passage that is the open passage, for example, whether it can move or in case it's already moving. The system allows any number of mobile racks per floor of a warehouse. FIGS. 2 and 3 are illustrations of a typical mobile rack arrangement in a warehouse, and should not be limited with respect to the present disclosure.

Figure 4A:
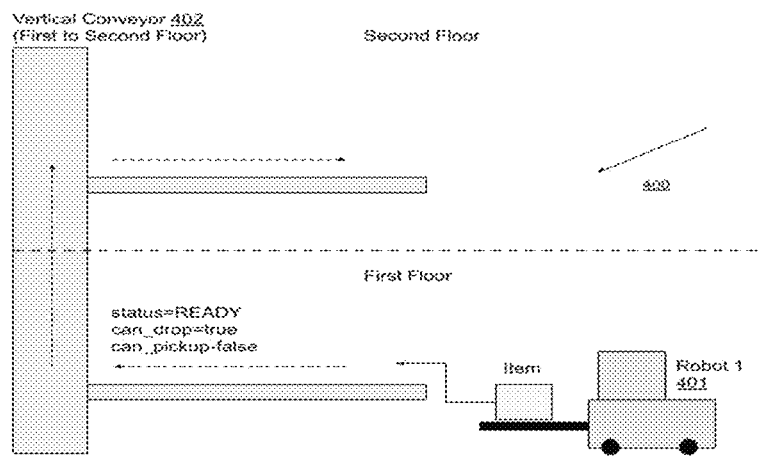
FIGS. 4A and 4B illustrate various arrangements of a device to move items between different floors in an operating environment, in accordance with some embodiments of the present disclosure.
Figure 4B:
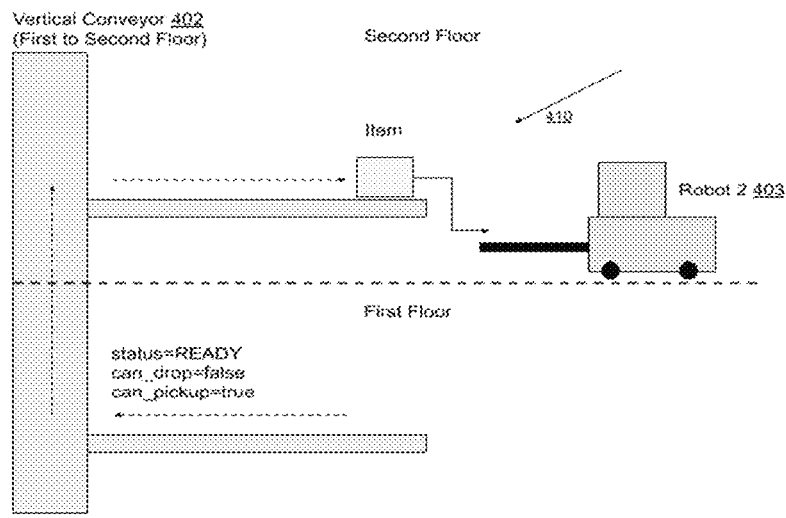

FIGS. 4A and 4B illustrate various arrangements of a device to move items between different floors in an operating environment, in accordance with some embodiments of the present disclosure. In one embodiment, the device to move items between different floors of the operating environment may be a vertical conveyor. Typically, the vertical conveyor is associated with directionality and may at least move items in a single direction, that is either up or down. The typical conveyor may also include a sensor suite that can detect the presence of an item at the entry point (drop location) or the exit point (pick location). A conveyor of the device may be activated when an autonomous vehicle like robot drops an item at the entry point, the item is then automatically transported to the target floor. Once the item arrives at the target floor, the conveyor broadcasts the current state to indicate that it is available for pick up. The system supports any number of vertical conveyors per floor of a warehouse. In this example, an autonomous vehicle, robot 1 401 is transporting an item on the first floor as shown in FIG. 4A. The item is transported to the second floor via a conveyor belt of a vertical conveyor 402. The status of the conveyor belt in 400 is ready. Also, as an example, it illustrates the conditions on which the item is moved. Herein, the robot 1 can drop the item indicating a true statement and the can pick up. Likewise, when the item arrives on the second floor as shown in FIG. 4B robot 2 at 403 picks up the item from the vertical conveyor 402. The status of the conveyor belt at 410 is ready and indicates the condition can drop as false and can pick up as true. These conditions are broadcasted to other autonomous vehicles in this case other robots in the premises. The status of each of these autonomous vehicles is broadcasted and updated as soon as an action is completed or a precondition is satisfied for smooth movement in the operating environment.

Figure 5:
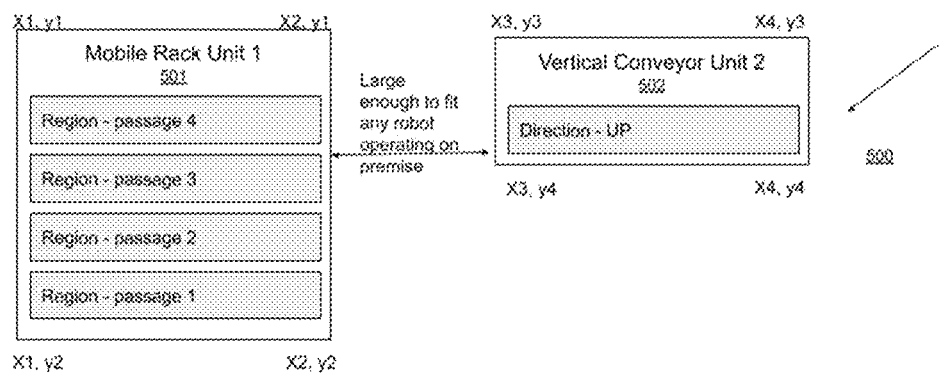
FIG. 5 illustrates a graphical representation of one or more devices, according to some embodiments of the present disclosure.

FIG. 5 illustrates a graphical representation of one or more devices, according to some embodiments of the present disclosure. In one embodiment, the one or more devices in a warehouse is represented by rectangular zones with properties including a unique ID associated with the device, each of the ID device is represented by a rectangular region with the coordinates specified for all the corners in a map frame of the graphical representation 500. Each of the devices may have additional properties that are valid for its type, for example, a mobile rack device can have multiple passages which are rectangular regions within a larger region of the mobile rack unit 1 501 and a vertical conveyor 502 may include a single direction operation. The rectangular regions are used by the system to determine whether the path intersects with another device or not. In one embodiment, the one or more devices may not overlap with each other. This implies that it is not possible to go from one device to another without passing through an open area that can at least accommodate an autonomous vehicle, for example at least one robot.

Figure 6:
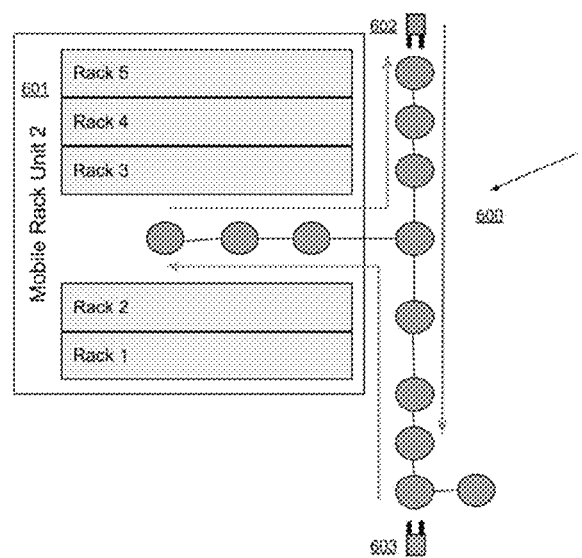
FIG. 6 illustrates a process to navigate a route plan for a plurality of autonomous vehicles, in accordance with some embodiments of the present disclosure.

FIG. 6 illustrates a process to navigate a route plan for a plurality of autonomous vehicles, in accordance with some embodiments of the present disclosure. In one embodiment, 600 represents a route plan for two or more autonomous vehicles in an operating environment. For example, a plurality of autonomous vehicles includes two forklifts, first forklift 602 and a second forklift 603 operating in a mobile rack unit 601. As shown in FIG. 6, a plurality of nodes represents a navigation path or a route plan for the first forklift 602 from rack 1 to rack 2. The route plan of forklift 603 moves in the direction from rack 1 to the passage as shown in the FIG. 6 and doesn't pass through another device, device space or area around a device. On the other hand, the second forklift 603 passes through the aisle of the mobile rack unit 601 to avoid a collision. The second forklift 603 is shown entering the space between rack 2 and rack 3 of mobile rack unit 601 and exits from the passageway to move towards the other end of the mobile rack unit 601. The first forklift 602, however, doesn't enter any of the zones and can take a direct path to reach the destination as does the second forklift 603. In accordance with an embodiment, this is one of the many scenarios covered within the scope of the present disclosure handled by the system to avoid deadlocks or collisions or robots waiting at the passageways.

Figure 7:
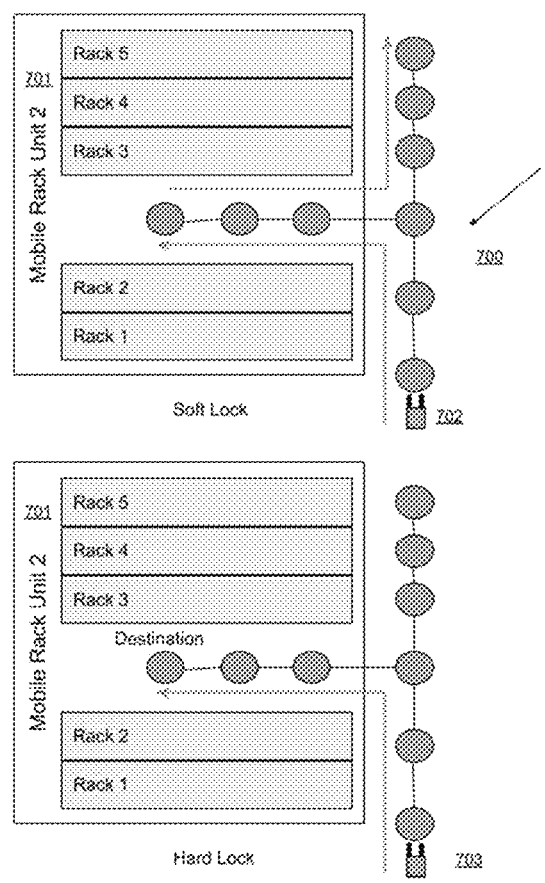
FIG. 7 illustrates a process of acquiring a soft lock and a hard lock by an autonomous vehicle, in accordance with some embodiments of the present disclosure

FIG. 7 illustrates a process of acquiring a soft lock and a hard lock by an autonomous vehicle, in accordance with some embodiments of the present disclosure. In one embodiment, the route plan generated by MRRP for an autonomous vehicle is represented by a sequence of discrete checkpoints in a 2D plane represented by x, y coordinates, and orientation. For example, the generated route plan for the autonomous vehicle routes can optionally start from a region or zone containing a device, pass through multiple device regions or terminate into one. In case, the generated route plan intersects with any of the device zone, the autonomous vehicle announces intent to the system to pass through the device zone and seeks permission from the respective device controller node. In accordance with present embodiment, the device zone refers to the area around a device, for example, a rack. The permission is represented as a hard or soft lock. A hard lock is required when the final destination of the autonomous vehicle lies inside the device zone. A soft lock is required when the autonomous vehicle route just passes via a device zone. As shown in FIG. 7, the process of acquiring the soft lock or hard lock is represented by 700 including an autonomous vehicle operating at mobile rack unit 701. The autonomous vehicle 702 is depicted to show the soft lock and the autonomous vehicle 703 is depicted to show the hard lock. The autonomous vehicle 702 is traversing a plurality of nodes from rack 1 to destination node and passing via mobile rack unit 701 and hence a soft lock is requested. In one embodiment, the soft lock may be granted to an autonomous vehicle even if another autonomous vehicle holds a soft lock to the same device. However, in the case of a mobile rack unit, the soft lock may be granted only if the requested passage is open. Also, before granting a hard or soft lock, the device controller node may decide whether any other device actuation is required. For example, in the case of a mobile rack, the controller node might need to open the required passage before granting a hard lock and on the other hand may not have to perform any other action before granting a soft lock. The system instructs respective device controller nodes on whether or not a hard lock may be granted to more than one autonomous vehicle. In another embodiment, the autonomous vehicle 702 is traversing a plurality of nodes from rack 1 to destination node between rack 2 and rack 3 of the mobile rack unit 701 and hence a hard lock is requested. For example, on this type of device, a mobile rack controller node associated with a mobile rack device may grant hard locks to all the autonomous vehicles arriving in the same passage while a vertical conveyor node associated with a vertical conveyor device may grant hard lock to a single autonomous vehicle. In one embodiment, an autonomous vehicle may have a hard lock or soft lock before it enters a device zone and releases the lock as soon as it leaves the device zone.

Figure 8:
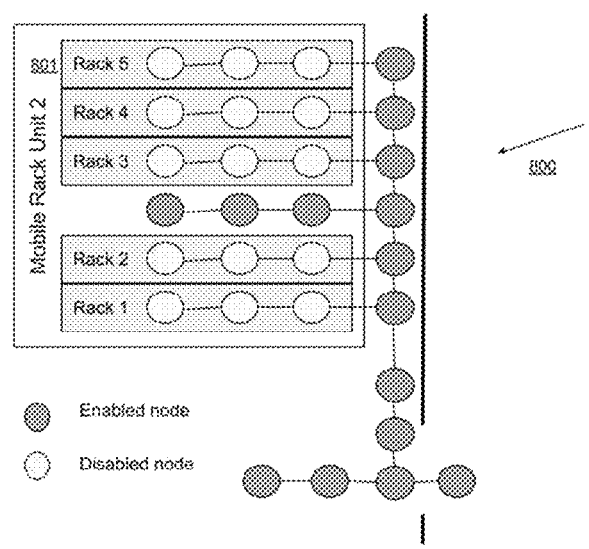
FIG. 8 illustrates a graphical representation of route plan depicting nodes and edges covering a device area, in accordance with some embodiments of the present disclosure.

FIG. 8 illustrates a graphical representation of route plan depicting nodes and edges covering a device area, in accordance with some embodiments of the present disclosure. In one embodiment, the MRRP optimizes global planning of routes for a plurality of autonomous vehicles working in an operating environment. The MRRP plans routes based on a discrete representation of a map in the form of a graph with connected nodes and edges. The graph may be generated manually or auto-generated using the BLA/UI as described in FIG. 1. For example, as shown in 800 of FIG. 8, an autonomous vehicle like a forklift requests a hard lock to a passage in a device like mobile rack unit 2 801. The MRRP generates a route plan as a response to the mobile rack unit 2 and LBC running on the forklift requests the system for a hard lock on the mobile rack unit 2 801. At the same time, there is a possibility of another forklift waiting at the entry point of the passage between rack 3 and rack 2 and waiting for a hard lock on rack 2. Since, both the forklifts are waiting for the hard locks, the first forklift may not be able to navigate as the second forklift may be blocking the path and the second forklift may be blocking the path as the forklift is not able to get the hard lock. Embodiments of the present disclosure provides technical solutions to resolve such deadlock scenarios or inefficient waiting time by the forklifts that include the system invoking a passive request to the MRRP module. In such a scenario, in response to the passive request, the MRRP module may instruct the forklift to move to any other location to give way to one of the forklifts. The LBC running on the robots, like forklift may decide whether a passive request is to be initiated or a path to navigate to a destination may be requested. As shown in FIG. 8, the gray colored nodes are disabled (passive) by invoking a passive request.

In another embodiment, the system may include lock management. For example, the first forklift and the second forklift request for a lock and one of the two forklifts may acquire a lock for open passage between rack 2 and rack 3 based on one or more predetermined conditions. In this example, the first forklift acquires the lock and the second forklift is still requesting for a lock but not acquired yet. In this case, the nodes in rack 2 may not be enabled as at a time only one passageway may be opened. In one example, both the forklifts may request a path to navigate to the destination, in such examples lock acquisition and release may happen in a regular way as described herein. The MRRP of the system performs a pre-processing to check the first forklift's request, where the first forklift requests to arrive at a node in rack 2, which is disabled and the passageway is not open (as shown in rack 2 of FIG. 8). The MRRP backtracks the nodes and checks for the node which is enabled and nearest to the destination of the first forklift. The node is then treated as a destination for the first forklift instead of the node in rack 2. Herein, the MRRP keeps the forklift moving by providing a node nearest to the destination of the first forklift but may not allow the first forklift to enter the node is rack 2 to avoid collision/deadlock situations. The MRRP replaces the node meant as the intended destination with the enabled node nearest to the device. The status of the first forklift may still be waiting since it has not arrived at the destination node (in accordance with the LBC context), however the first forklift is traversing towards the destination or alternative destination via a different route by invoking a passive route request. Therefore, if a node is not enabled for a forklift, then MRRP initiates a passive path for the forklift.

Figure 9:
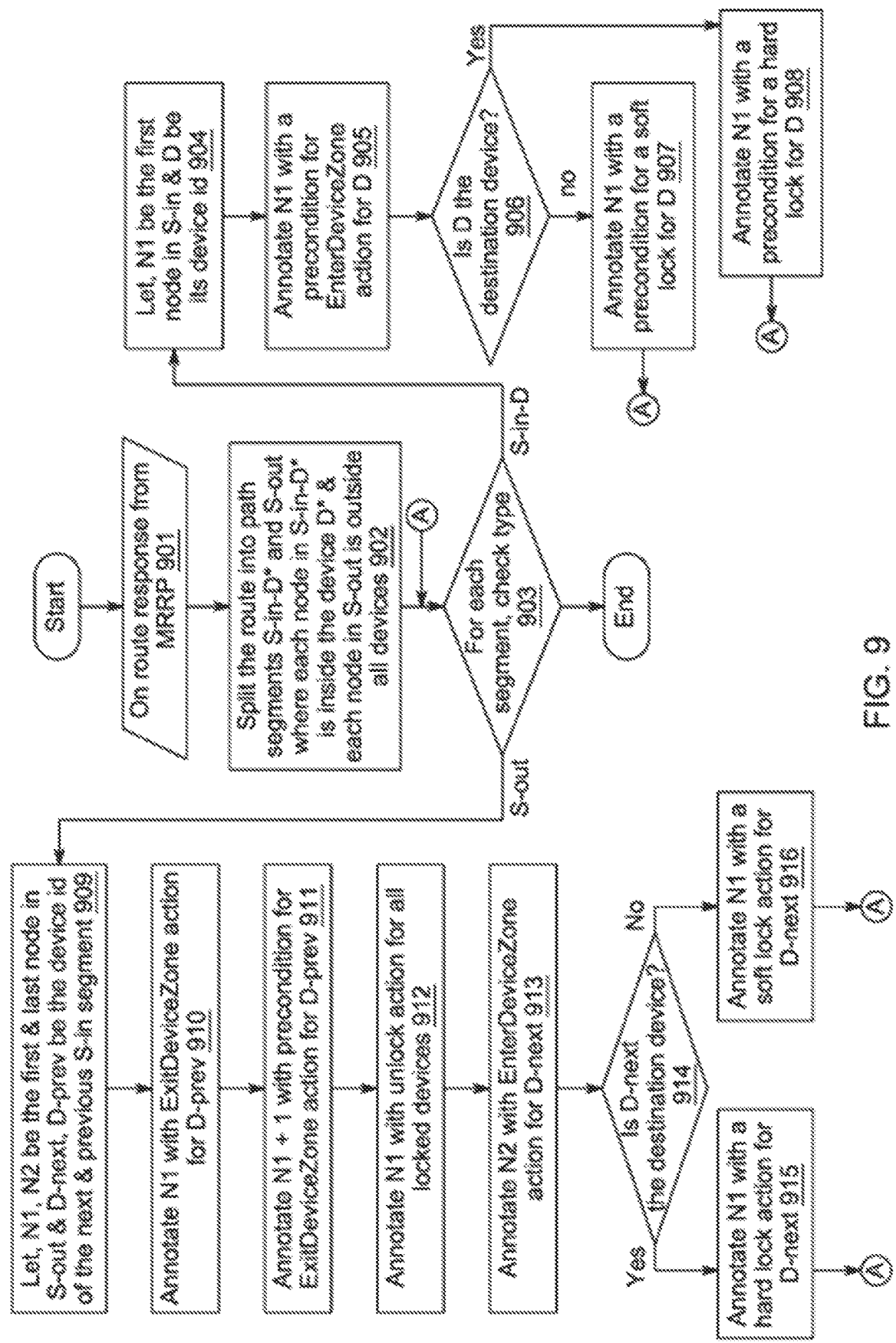
FIG. 9 illustrates a flow-diagram of a method 900 for multi-robot route planning, in accordance to some embodiments of present disclosure

FIG. 9 illustrates a flow-diagram of a method 900 for multi-robot route planning, in accordance to some embodiments of present disclosure. The method 900 may be described in the general context of computer executable instructions. Generally, computer executable instructions can include routines, programs, objects, components, data structures, procedures, modules, functions, etc., that perform particular functions or implement particular abstract data types. The method 900 may also be practiced in a distributed computing environment where functions are performed by remote processing devices that are linked through a communication network. The order in which the method 900 is described is not intended to be construed as a limitation, and any number of the described method blocks can be combined in any order to implement the method 900, or an alternative method. Furthermore, the method 900 can be implemented in any suitable hardware, software, firmware, or combination thereof. In an embodiment, the method 900 depicted in the flow chart may be executed by a system, for example, the system 100 of FIG. 1. The method 900 of FIG. 9 will be explained in more detail below with reference to FIGS. 1-8.

Referring to FIG. 9, in the illustrated embodiment, the method 900 is initiated at 901 where the method includes sending a route plan in response to a request received by an autonomous vehicle from amongst a plurality of autonomous vehicles in an operating environment. The operating environment includes one or more devices, the one or more device includes a device, a device space and area around a device. The route plan includes a plurality of nodes as represented in FIG. 8. The system of FIG. 1 instructs the MRRP to send a route response 901 based on a request received from the autonomous vehicle or for example, a robot. Herein, a robot is used as an example for an autonomous vehicle and may be used alternatively. The one or more devices refers to a device in an operating environment for example a mobile rack unit or a vertical conveyor. Herein a device may refer to a physical device like mobile rack unit, it may also refer to a device zone representing presence of a device in the vicinity or it may also refer to device space, that is area around a device representing a temporary space created to load and unload items in an open space of a warehouse. Examples of temporary space may include line indicators, columns, where items are loaded and unloaded using for example nestainer columns. The further steps of the method claim are described using a device as an example; however, the same or similar flow of the process step may apply to device zone and area around the device.

At 902, the method includes categorizing the route plan into path segments. The path segments may include a first path segment having one or more nodes from the plurality of nodes being inside a device zone of the one or more devices or a second path segment having one or more nodes from the plurality of nodes being outside the device zone of the one or more devices. The system categorizes the route plan into path segments, namely, S-in-D* indicating the first path segment and S-out representing the second path segment. Each node from one or more nodes in S-in-D* is inside a device D* and each node in S-out is outside one or more devices. The second path segment, S-out, indicates a navigation segment or a route plan that is open and not occupied by any device in the operating environment. The S-in indicates a navigation segment that belongs to a particular device. The S-in-D* represents a navigation segment that belongs to any device D*, namely, one or more devices D1, D2, D3 . . . Dn. For example, in case of device space, like temporary space, line indicators or columns act as a physical device to navigate within a particular space and the autonomous vehicle is managed in a similar method as of a physical device.

At 903, the method includes determining a type of path segment from the categorized path segments for each of the nodes from the plurality of nodes from the route plan. Herein, each of the path segments is checked for type of path segment, namely, S-out or S-in. If the type of determined path segment is the first path segment that is S-in, at 904 the method includes identifying the device with an ID and marked as a first device from the one or more devices and the first node from the one or more nodes of the first path segment is mapped to the identified device, for example, first device D1. The first node is then annotated at 905 with a first precondition which includes an action to enter the device zone of the first device. At 906, the method includes determining the destination node of the autonomous vehicle. If the first node is the destination not a destination node, then the first node of the first path segment is annotated with a second precondition. In one embodiment, the second precondition includes performing a hard lock action of the first device for the autonomous vehicle traversing the first path segment to the destination node. In another embodiment, performing a soft lock action of the first device for the autonomous vehicle traversing the first path segment via the one or more devices.

In one embodiment, at 903 the method includes determining a type of path segment from the categorized path segments for each of the nodes from the plurality of nodes of the route plan. Herein, each of the path segments is checked for type of path segment, namely, S-out or S-in. If the type of determined path segment is the second path segment that is S-out, at 909 the method includes identifying a first node N1 and second node N2 in the second path segment. Further, the first node N1 is mapped to D-next indicating a next device and N2 is mapped to D-previous indicating a previous device. At 910, the method includes annotating N1 with a first precondition including ExitDeviceZone action for D-prev and at 911 annotating with a second precondition N1+1 for including ExitDeviceZone action for D-prev. At 912 the method further includes annotating N1 with unlock action for all locked devices. Similarly at 913 the method further includes annotating N2 with EnterDeviceZone action for D-next. The D-next is checked for the destination device for the given autonomous vehicle at 914. At 915, the method includes annotating the first node of the second path segment with a second precondition based on determination of a destination node. The second precondition includes performing a hard lock action of the next device for the autonomous vehicle traversing the second path segment to the destination node. Similarly at 916, the method includes annotating the first node with a second precondition based on determination of a destination node from the one or more nodes, wherein the second precondition comprises performing a soft lock action of the next device for the autonomous vehicle traversing the second path segment via the one or more devices.

In one embodiment, the method is terminated at A. At A, the method concludes with navigation of an autonomous vehicle for a predetermined destination device. Once the autonomous vehicle reaches the destination device, the method of present invention is closed and the next step starts with determining a type of path segment, for each of the node traversing to the destination node from the categorized path segments, wherein the type of determined path segment being the second path segment comprising a second device from the one or more devices, wherein the second device is mapped to a second node from the one or more nodes of the second path segment, wherein the second node is assigned a first precondition comprising an action to enter the device zone of the second device. Herein, after either hard lock action 915 or soft-lock action 916, the system continues with the conditional loop 903. After the annotation steps 907 or 908, the system goes into the conditional loop 903. The entire process flow continues till the last segment is processed. Once the last segment is processed, the condition may be terminated.

Figure 10:
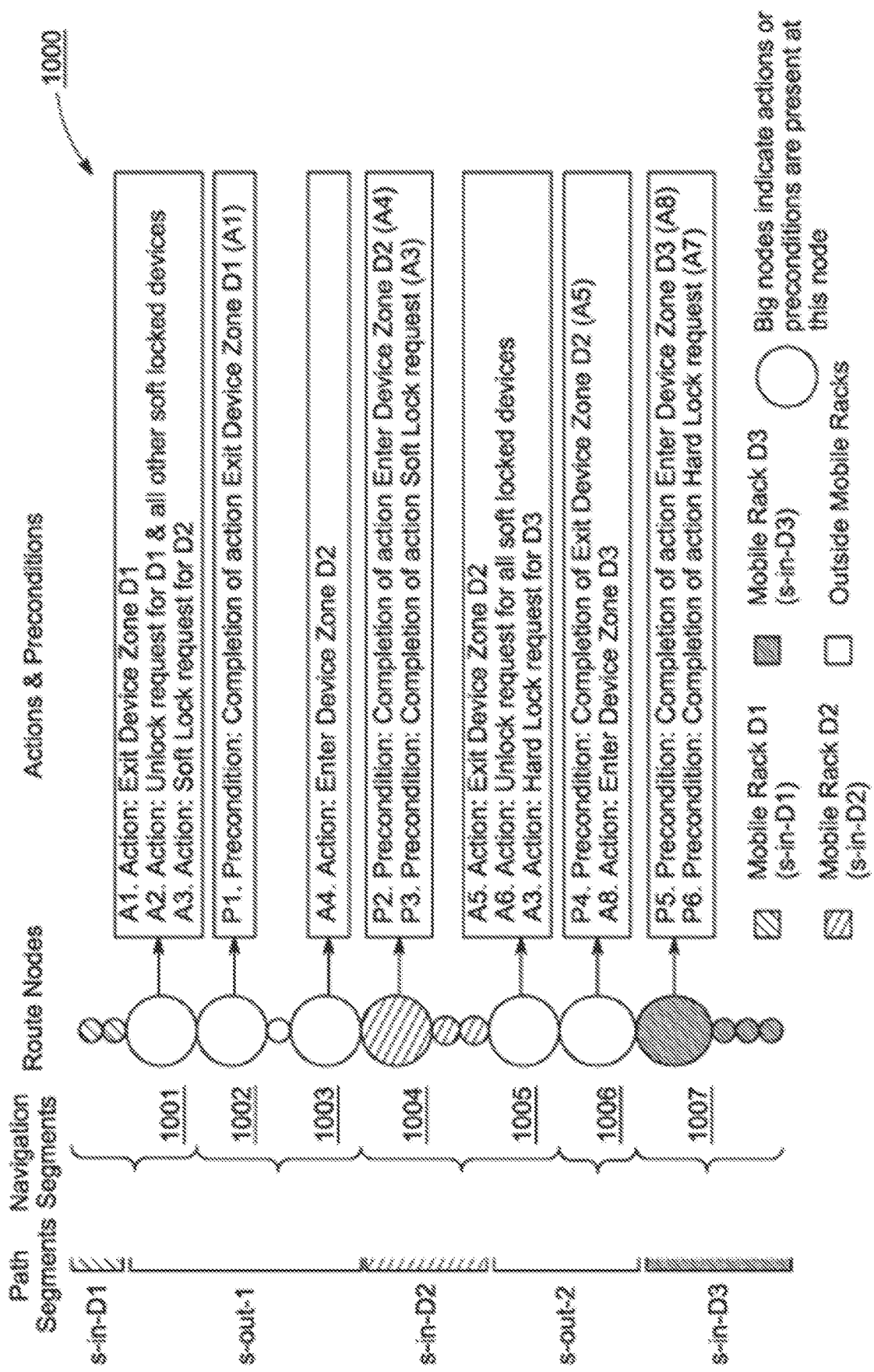
FIG. 10 illustrates a representation of a route plan annotations and categorized path segments, in accordance with some embodiment of the present disclosure.

FIG. 10 illustrates a representation of a route plan annotations and categorized path segments, in accordance with some embodiment of the present disclosure. In one embodiment, the representation of the route plan includes categorized path segments, navigation segments associated with each of the path segments. The categorized path segments correspond to one or more nodes depicted as route nodes. As shown in FIG. 10 and described in FIG. 9, the path segment is categorized as either first path segment S-in-D* and second path segment Si-out. The 1000 shows path segments which indicates that one or more route nodes (shown in the third column from the left) belong to the path segments of a device. As mentioned earlier in FIG. 9, the S-in-D* represents a navigation segment that belongs to any device D* (D1, D2, D3, etc.). Similarly, S-out-1 or S-out-2 indicates the navigation segment in which the autonomous vehicle is out in the open. The route nodes represented by white circles are not linked with any device. Since they are consecutive route nodes, they form one segment shown on the left side. Another set of nodes of route nodes includes a navigation segment associated with another device, for example 1007 and navigation segment 1005, 1006 indicates outside a device region. Herein, the route nodes are split into navigation segments that either belong to a device or not. In one embodiment, when one or more robots transitions from one device segment to a normal segment, there are actions associated with the transitions. For example, for node 1001, action A1 may be to invoke the exit device zone behavior for device D1. Herein, the device zone refers to space or region around the device D1. Then, an unlock request for the previous device D1 (as the previous device was D1 as shown in FIG. 10) is initiated and all other soft locks for devices are unlocked for the action A2. Thereafter, the system initiates a soft lock request for the next device that may be encountered in the path, which is device D2 and Action A3. All the actions are associated asynchronously or parallel to the path navigation of the robot, in other words, the robot is not at the specific route node or waiting for execution of the action (lock/unlock request), but may continue moving on the same path navigation.

Embodiments of the present disclosure provides a method and system that optimizes the navigation and throughput of the robot by running the actions associated asynchronously or parallel to the path navigation of the robot. For every action, there is a precondition, for example, somewhere in a future interval of time, the system expects the action to be completed before the robot proceeds any further than the node. At 1002, the precondition includes A1 action to be completed and hence A1 becomes the asynchronous action and indicates that the robot may not navigate to the node represented by 1002 if the action event A1 is not complete. For example, if a robot is not applied with a precondition at the next instance, the precondition can be later moved at a much later interval of time. At 1003, before the robot enters the device zone D2, the action A4 is initiated and the enter device zone D2 request is initiated. At 1004, the system places a precondition P2 that includes the request enter device zone D2 (A4 action) should be completed before the robot navigates further. The precondition P3 expects the completion of soft lock request (A3) in a past action. Therefore, the robot navigates from node 1001 to node 1003 freely and in such a way that the mobile rack may be moving. In another embodiment, various optimization steps may be performed by the system and the robot may not proceed to node 1004 till the preconditions P2 and P3 are not satisfied. This means that the system may have acquired the lock for device D2 before the robot can enter the device zone D2. The same cycle repeats. At 1005, the action exit device zone D2 is initiated with all soft locked devices released. Action A7 leads to the initiation of a hard lock request for D3 as the device lies at the destination. At 1006, the next precondition P4: completion of exit device zone D2, similar to the previous transition is satisfied. At 1007, before transitioning to the node, there are two preconditions that should be satisfied, namely, P5: completion of enter device zone D3 request and completion of hard lock request action A7. The cycle of action and preconditions continues until the destination/task assigned is reached/completed by the respective robot.

Figure 11:
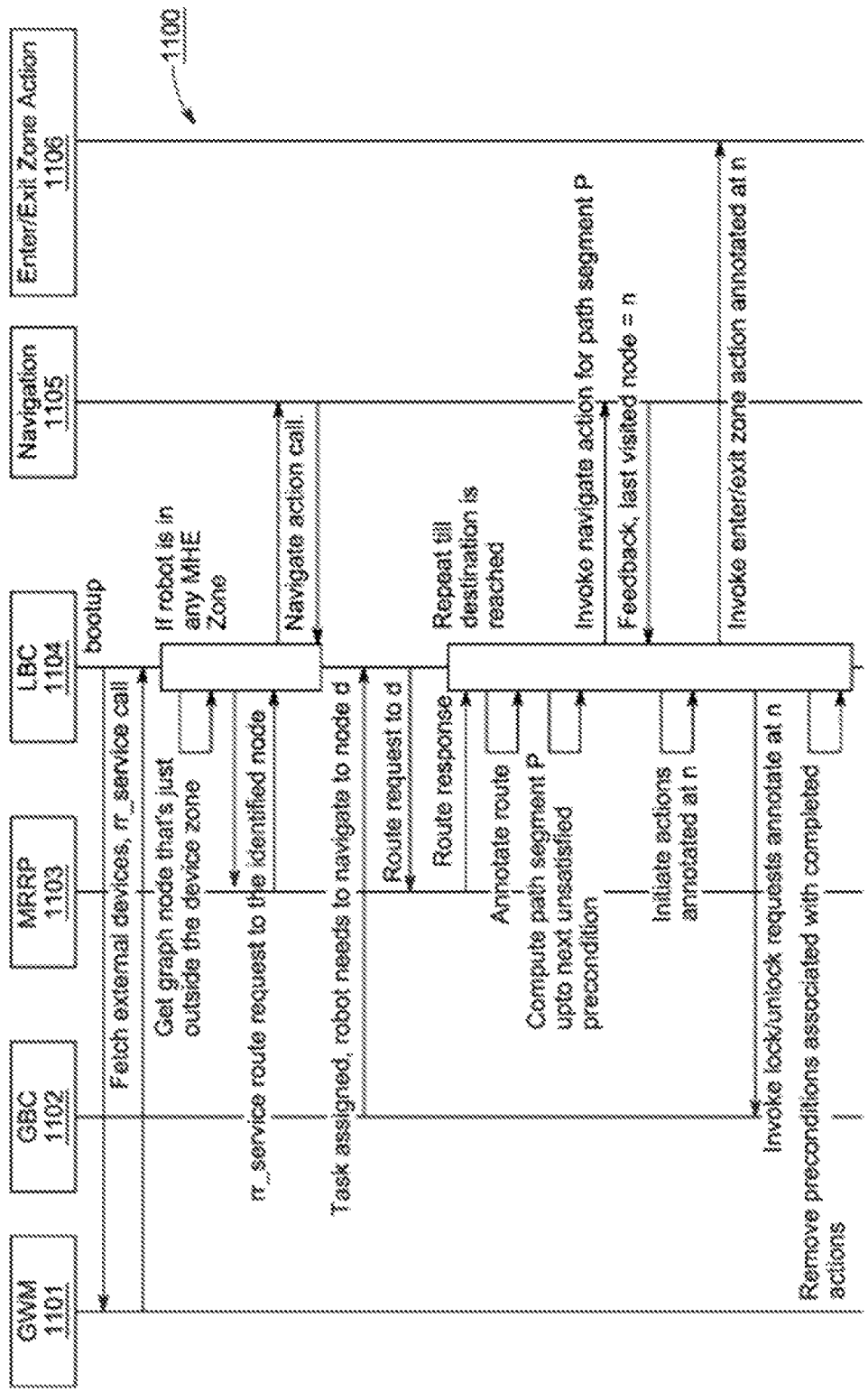
FIG. 11 illustrates a sequence diagram for navigation action between various system components of FIG. 1, in accordance with some embodiments of the present disclosure.

FIG. 11 illustrates a sequence diagram for navigation action between various system components of FIG. 1, in accordance with some embodiments of the present disclosure. The sequence diagram 1100 represents a flow for a single autonomous vehicle, for example, a robot, however, the system is not limited to a single robot and may be used to control AMRs (Autonomous mobile robots), AGVs (Autonomous Guided Vehicles), other vehicles that may perform similar functionality as disclosed within the scope of this invention. For representative and simplicity purposes, all the figures may be included with limited vehicles, however, the system can be used to control and manage the synchronization between devices (mobile racks, virtual conveyors, sheet shutters, etc.), area around a device, device space (temporary space) and vehicles (automated forklift, etc.) In one embodiment, when the robot boots up, the LBC 1104 running on the robot places a request to GWM 1101 for fetching device information in the warehouse. The LBC 1104, based on the requests, verifies whether the robot is in the device zone and a service route request is initiated to exit the device zone immediately. As LBC 1104 has no context on what the robot is doing in the specific device zone, the device is instructed to exit the device zone. As the zones are considered to be a safe zone, the system expects the robots to acquire locks before entering the device zones. In one embodiment, when the device is booted up, the robot is already in the device zone. So, the system implements a safety maneuver to rush the robot outside the device zone. If the LBC 1104 determines that the robot is in any device zone (for example MHE zone), the LBC 1104 provides a graph associated with a node or identifies the location just outside the device zone. LBC 1104 gets the route from the MRRP 1103 and invokes the navigation for the robot to navigate. The aforementioned steps are performed at the booting up of the robot phase.

In one embodiment, after the bootup phase, GBC1102 may assign a task to the robot. Based on the task assignment, the robot navigates to a node, for example node D (represents a destination node) for performing the task. Once a defined task is assigned to the robot, LBC 1104 requests MRRP 1103 for a route plan to navigate to D. For example, MRRP 1103 may provide one or more route plans and route responses. Following the receipt of the route plan, the sequence diagram 1100 denotes the flow as to be repeated till the destination is reached. For example, when LBC 1104 receives the route, the route is annotated and the path segment P is computed up to the next unsatisfied precondition. The system invokes navigate action for path segment P. The LBC 1104 receives feedback from navigation component 1105. The navigation feedback may facilitate marking the navigation progress of the robot and LBC 1104 keeps track of the nodes that have crossed and updates the system. The navigation feedback received may also include the last visited node by the robot. In this case the last visited node may be n. Based on the last visited node, actions and requests (hard or soft locks) are initiated to annotate at n. The system invokes enter/exit zone action annotated at n as described in FIG. 9. The system later invokes lock/unlock requests annotated at n. The preconditions associated with completed actions are later removed. This process is repeated till the destination is reached.

Figure 12:
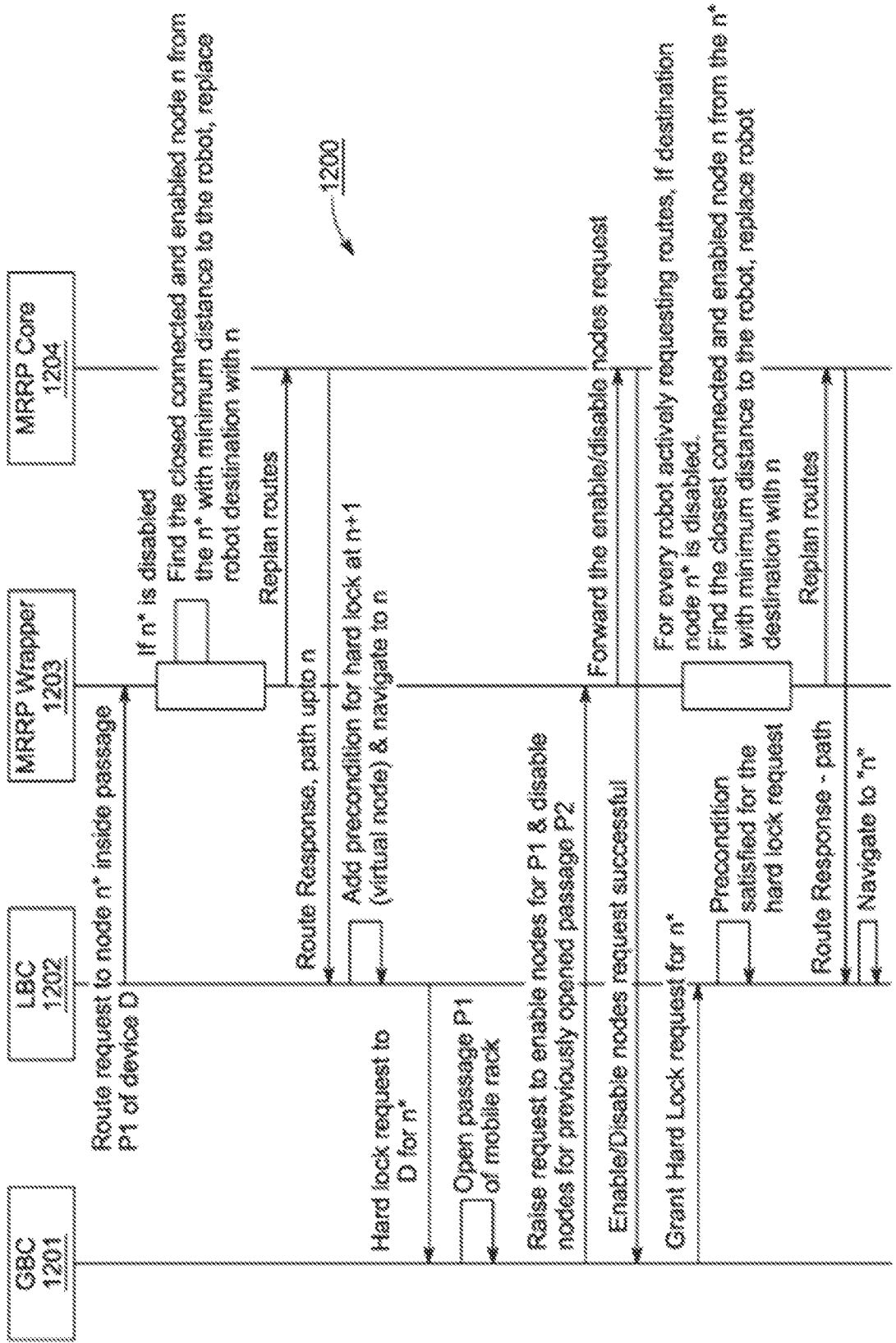
FIG. 12 illustrates a sequence diagram for communication between various system components of FIG. 1, in accordance with some embodiments of the present disclosure.

FIG. 12 illustrates a sequence diagram for communication between various system components of FIG. 1, in accordance with some embodiments of the present disclosure. The sequence diagram 1200 shows communication between GBC 1201, LBC 1202, MRRP wrapper 1203, and MRRP core 1204 of the system 100. In one embodiment, the LBC 1202 requests a route to node n* (a plurality of nodes) inside passage P1 of device D. If the node n* is disabled, the MRRP wrapper 1203 identifies the closest connected and enabled node from the n*. For example, if a node is disabled in a passage, other nodes in the passage may also be disabled. So, the MRRP wrapper 1203 may identify a node that may be at any of the entry points of a device, for example, a mobile rack, either on the left side or right side of the racks. The MRRP wrapper 1203 finds the node which is enabled on either side, however, the identified node may be the closest node from the destination. The robot destination is then replaced with node n. The MRRP wrapper 1203 triggers the replanning of routes for all the active robots and then forwards the route response received from the MRRP Core 1204 to the LBC 1202. Then, LBC 1202 performs the annotation tasks and adds precondition for the hard lock at n+1 (virtual node) and navigation to n. The LBC 1202 has to request the GBC 1201 to release the hard locks, initiate the opening of passages, and enable the nodes within the passages. The GBC coordinates the opening of passage P1 of the mobile rack. The GBC 1201 requests the MRRP Wrapper 1203 to enable the nodes for P1 and disable nodes for previously opened passage P2. The MRRP Wrapper 1203 forwards the received request to MRRP Core which, based on the requests, successfully enables/disables nodes. The MRRP Wrapper 1203 repeats the above steps for every robot that is navigating in the warehouse. For example, when destination node is disabled, the MRRP wrapper 1203 finds the closest connected and enabled node n from the n* with minimum distance to the robot and replaces the route destination with n. Followed by the replaced route destination, the MRRP wrapper 1203 replans the route which is forwarded by the MRRP core 1204 to LBC 1202 as route responses. The LBC 1202 then continues with navigation to n*.

Figure 13A:
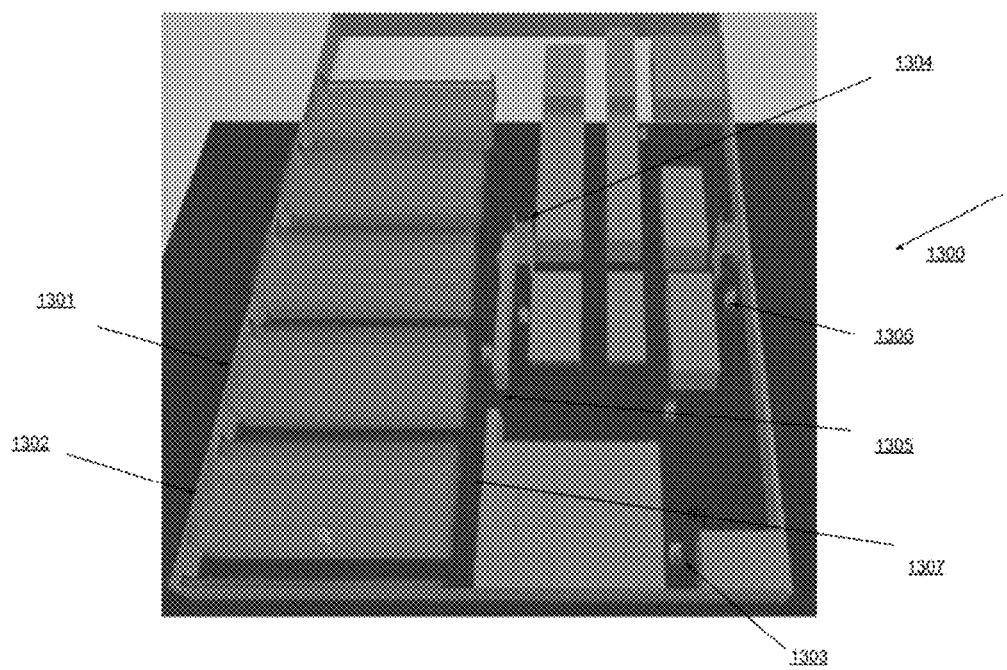
FIGS. 13A-13C illustrates a top view of a warehouse with device and device space, in accordance with some embodiment of the present disclosure
Figure 13B:
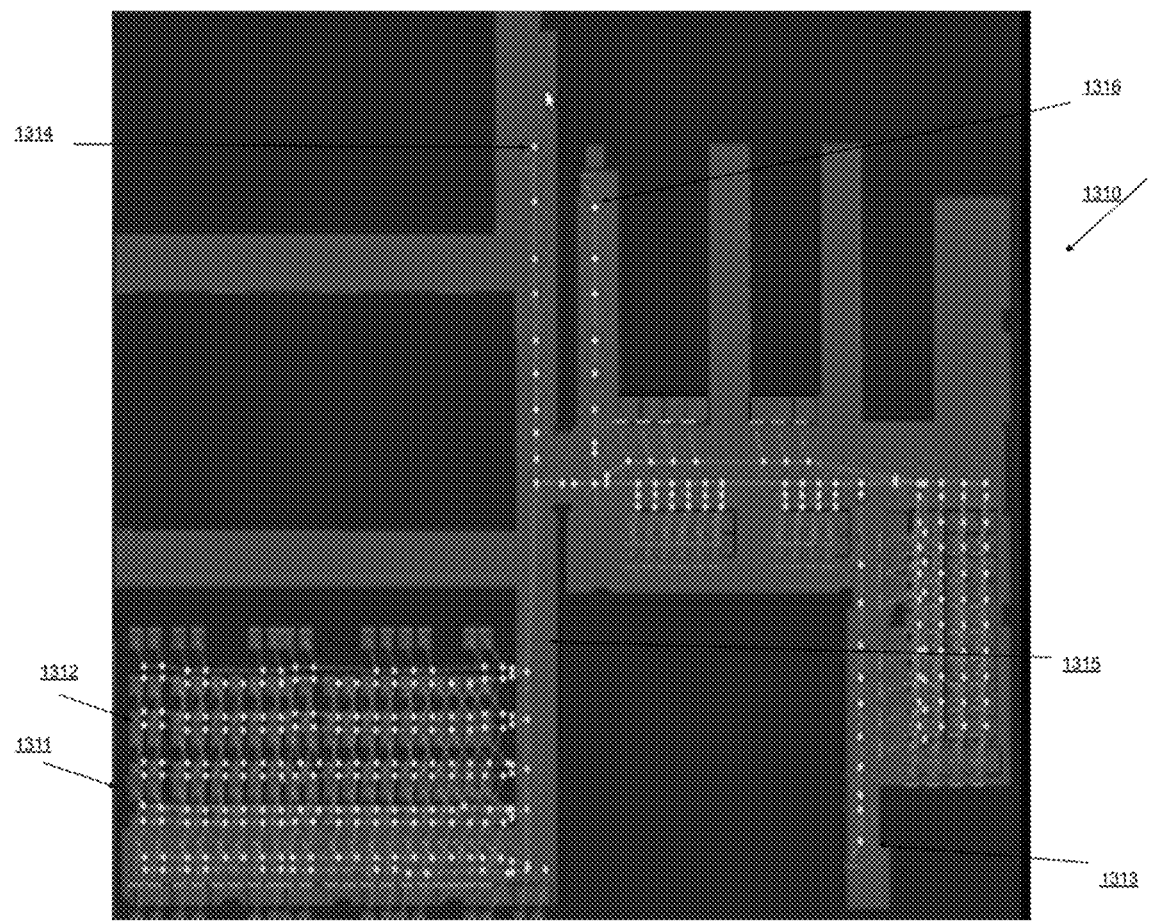
Figure 13C:
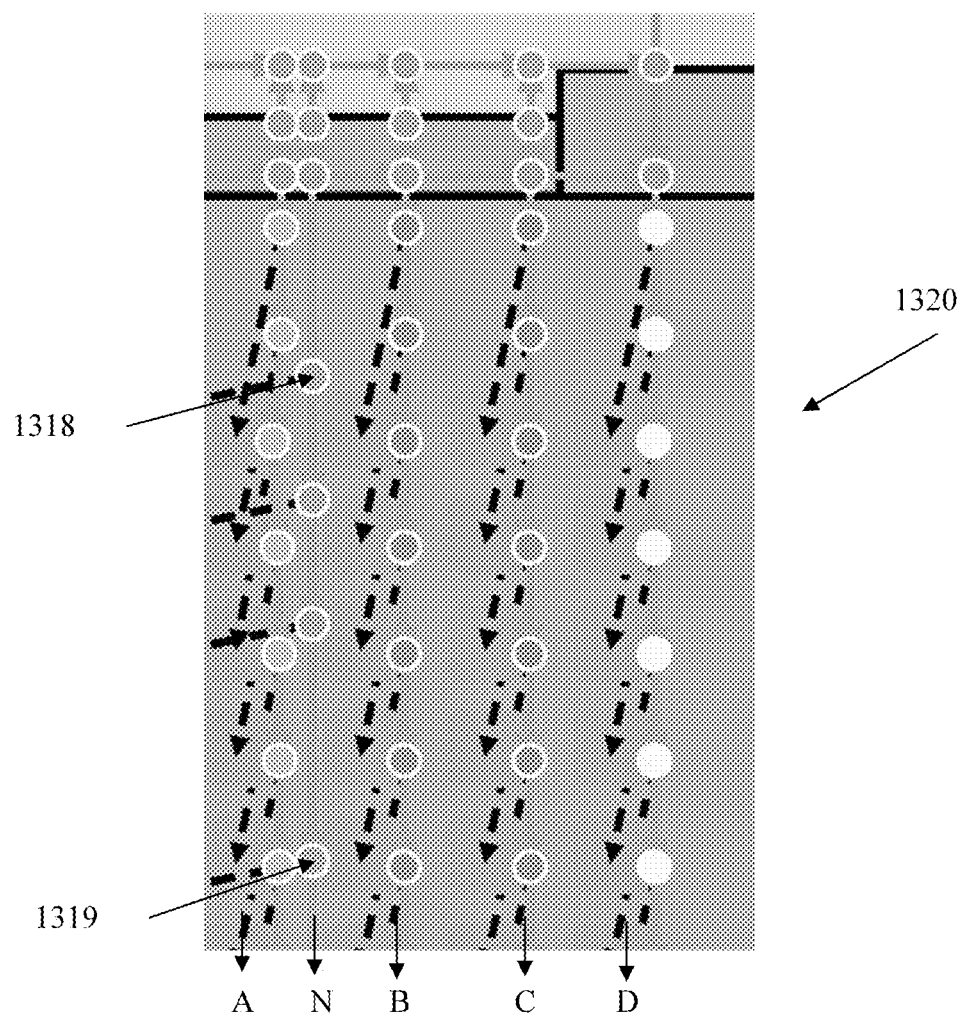

FIGS. 13A-13C illustrates a top view of a warehouse with a device and a device space, in accordance with some embodiment of the present disclosure. In one embodiment, an autonomous vehicle, in this example robot 1303 navigates within warehouse 1300, the robot 1303 navigates the warehouse using the multi-robot route planner (MRRP). Embodiments of the present disclosure support multiple devices, like multiple mobile racks 1301, 1302, etc. The mobile racks have different passages and the entire racks may be moved depending on passage the robot 1303 navigates based on the task assigned. For example, a robot like an automated forklift 1303, may be assigned a task to drop an item in rack 1301, then a request may be sent to a mobile rack controller node to open the rack 1301. Similarly, when the forklift 1303 is moving out of the mobile rack, the lock on rack 1301 is released. The opening and closing of the mobile rack 1301 are handled by the mobile rack controller node. The system of present disclosure controls a forklift 1303 operating in a mobile rack 1301 in such a way to permit another forklift from accessing a different mobile rack 1302. i.e., each mobile rack can have a forklift operating inside at the same time.

In another embodiment, in FIG. 13B, a forklift navigates to fourth passage 1312 of mobile rack 1311. In this embodiment, communication is initiated with GBC. The LBC running on the forklift communicates with GBC to approve a permit to enter into the passageway of rack 1307. Once permission is approved, GBC communicates with the mobile rack controller of mobile rack 1311 to open the passageway on rack 1311. The GBC component at the server end performs the traffic control functionality of mobile rack 1311. The scenario may be extended to multiple devices, like mobile racks in a warehouse and multiple robots. Embodiments of the present disclosure provides a method and system to handle multiple devices and maintain synchronization, coordination, deadlock avoidance, reducing parking time, etc. For example, a plurality of robots may be in close proximity to one or more devices. In one embodiment, in some warehouses, the passageway between mobile racks and other areas of the warehouse may be narrow, like 1307 or 1315. In an alternative embodiment, there may be only one entry and exit 1305 for a robot to navigate around the warehouse. Embodiments of the present disclosure provides a method and system supporting multiple robots, for example, automated forklifts 1303, 1306, etc. navigating on multiple floors.

In one embodiment, as shown in FIG. 13B, with presence of multiple mobile racks 1301, 1302, multiple robots 1303, 1306 navigating within passage of the multiple mobile racks and multiple floors available for navigation with narrow passageways 1307 or 1315 between the mobile racks and other regions of the warehouse that may have single entry or exit points 1305, navigation is challenging. In this embodiment, the present disclosure enables movement of multiple forklifts 1303, 1306 within the passageway of the mobile racks by allowing multiple maneuvers, like a forklift, that may enter the passageway after the rack is opened while allowing another forklift within the passageway to pass and exit the mobile rack. In another embodiment, the system and method of the present disclosure may also enable on-demand functionality. For example, whenever the mobile controller node moves the mobile rack 1301, 1302, the controller node disables all the nodes 1312 of the mobile rack 1301 first and moves the mobile rack 1301 passage, and then enables the node 1312 only within the passage. This will help the MRRP not to send forklifts 1303, 1306 to those disabled nodes in the passages. Conventionally, the forklifts perform the function of palette picking and drop to the mobile racks, however, in such complex scenarios, the system may instruct the forklift 1303, 1306 to come out of these mobile racks 1301, 1302, coordinate traffic in the narrow corridors, handle safety concerns, for example, a forklift may be asked to drop a palette on the mobile rack, another forklift may use an open passage, temporarily use the open passage, come out. Embodiments of the present disclosure uses the principle of granting and releasing the locks (soft and/or hard) to enable the safe movement of forklifts within the passageways of the mobile racks.

In other embodiments, when the forklift enters into the rack onto a path, the system and method present disclosure takes steps to ensure that the localization of the forklift is not lost. For this, an enter and exit device zone area behavior is ensured, however as the mobile racks move, the localization may be lost. So, the system triggers Enter or Exit device zone behavior (e.g., map switching) before the forklift enters the mobile rack area. In one embodiment, the system allows MRRP to route forklifts via open passages of mobile racks. The system provides high-level functionalities to handle external devices (mobile racks 1301, 1302, vertical conveyors 1304, sheet shutters in a generic way. The system is aware of the various devices in the warehouse, and information related to the devices, for example, coordinates of the rectangle that encompasses a mobile rack 1301, 1302, etc. When the forklift boots, the system components running on the forklift pull the device information from the GWM module of the server, for example, coordinates of each device. The system components running on the forklift requests a path from the MRRP module of the server to navigate from one location to another location in the warehouse. When the MRRP sends the response, the response includes a list of nodes (source node 1313 or destination node 1314 or intermediary nodes as shown in FIG. 13B that may include detours, preconditions on each checkpoint, etc. The MRRP may provide a list of checkpoints and preconditions, for example, that a second forklift may have crossed a specific index on its route ID for working on the route coordination of the MRRP. Once the forklift gets the route response from the MRRP, the route will be transformed into more preconditions. The precondition may be that a particular forklift can only cross from one checkpoint to another if the said forklift has a lock on the external device. Moreover, the present method and system enables the execution of the path received from the MRRP against the list of known devices 1301, 1302, 1304, etc., and then the system takes a decision on whether the path intersects with any of the other devices. When the path intersects, the LBC running on the forklift asks for a path from the appropriate device controller node to get access to enter into the passage supported by the device. So, as the forklift moves towards destination 1314, the forklift 1303, that is, the LBC running on the forklifts, continuously asks for access permission to the device controller node. The device controller node then initiates the action to open the passageway associated with device 1311. If the said forklift is first in the queue, then the controller node may grant the permission. When the forklift arrives at the entry point and checks the permission, and accordingly continues on its navigation path. When the said forklift has to exit out of the path associated with the device, then, the forklift has to release the lock.

In another embodiment, the LBC receives the path from the MRRP, the system verifies the path response with the known set of devices, and then as the forklift is already within the passage of the device, the first checkpoint that takes the forklift outside the device, then the system instructs for unlocking the device. For example, when path of a plurality of forklifts intersects with multiple mobile racks 1301, 1302, and the first forklift 1303 is coming from a node 1313 and the second forklift 1306 is coming from a node 1314 and if the destination of the first forklift 1303 is within the device 1301, then, the first forklift acquires permission for the hard lock on the device 1301 as the mobile rack 1301 has to be moved to give way for opening the passage and enabling the nodes 1312. While the second forklift may just need a detour, via an already opened passage, instead of moving the mobile rock, hence, the second forklift needs a soft-lock instead of a hard lock on the device. This will allow both forklifts to pass through each other without leading to a deadlock. When the second forklift may collide or lead to a deadlock, the second forklift 1306 takes a detour and enters into an open passage, moving away from the path of the first forklift 1303.

Embodiments of the present disclosure allows multiple forklifts 1303, 1306 to hold the lock for a single passage in the mobile rack 1301. So, no two forklifts may have a hard lock on the same device but the forklifts may have a hard lock and a soft lock at the same time. Sometimes, opening a rack 1301 may take some time, so, if LBC running on forklift 1303, may request for a path to a particular node in the rack 1301, and even though the passage may be closed, then, LBC may send a path to the nearest path that is enabled and closest to the node outside the mobile rack. Once the mobile rack 1301 has moved, then the LBC sends an updated path as each node in the passage is enabled. In another embodiment, the forklift 1303 may want to navigate to a vertical conveyor zone near the vertical conveyor 304. The final node 1314 may be part of the vertical conveyor zone. When the forklift boots up, the LBC runs the path through known external devices, and when the LBC checks that there is an intersection, then the LBC requests lock permission. If there is no intersection, then the system applies a precondition and does not allow the forklift to move forward until the precondition is satisfied. Similar to the steps described above, the system handles the other devices, like vertical conveyor and sheet shutter.

In another embodiment, when a passive route request is presented by an autonomous vehicle, one or more solutions may be offered to resolve the deadlock situation. For example, a forklift receiving a passive path request may change destination, navigate another route and resume the assigned task. In another example, in a forced passive conversion, two or more forklifts may have an overlapping destination which may be detected by MRRP wrapper. Herein, the first forklift may reach the destination while the second forklift is forced to take a passive route until the first reaches the destination. Similarly, in a temporary space environment, a forced passive request may be implemented. In another example, when the first forklift and second forklift have overlapping destinations, and when the first forklift is in device region and the second forklift is not, then the MRRP wrapper may convert the second forklift's route plan to a passive path. In one embodiment, overlapping destinations may be resolved in favor of robots that are inside device regions, helping them get out of the region. In another example, a flag, for example a parkable flag, may be implemented in MRRP for certain designating nodes that may not be used as end point of a passive path and used as a parking spot for robots with actual destination.

FIG. 13C illustrates a top view of a warehouse with device space, in accordance with some embodiment of the present disclosure. As mentioned earlier, the device space may include temporary spaces 1320 created in a typical warehouse for drop or pick of item. As shown in FIG. 13C, four main columns of spots are located and one additional path of nodes to drop at a nestainer. The four main columns are divided by line indicators, marking boundaries of each nestainer. The navigation path, containing plurality of nodes, for the first nestainer is represented by nodes N1, N2, N3 . . . Nn, where N1 depicted as 1318 is the first node where a forklift enters the temporary space while traversing to pick from a nestainer and 1319 is the last node depicted by Nn. In one embodiment, a task assigned to an autonomous vehicle is to pick up items stacked on a nestainer from an inbound temporary space. The navigation path for temporary space may follow a similar method and system as described for rack or any other device units with some modifications. For example, when the task of picking up items is assigned and new pallets are placed in the temporary space then the task assigned to the autonomous vehicle will be interrupted. To overcome the aforementioned technical problem, each region in temporary space is assigned a column, for example, column containing a nestainer.

Embodiments of the present disclosures provides solution for one or more technical problems involving handling of temporary space (temp space). The one or more technical problem may be lane access control, node enabling/disabling, boundary identification, distance between lanes and the like. In an example, one of the main concerns includes lane access control. The land access control prevents forklifts from entering lanes adjacent to another forklift. Also, node disabling/enabling prevents forklifts from being rerouted into the temp space by the MRRP. In an example embodiment, the node connected to the outside world is annotated as the entrance node. For example, each spot in the temp space region is annotated with metadata specifying its column as A, B, C, D or N (for the nestainers) as shown in FIG. 13C. This will also allow annotating the columns of nodes at the associated node of the spot. In case of temp space, a soft lock is considered as 'in queue'. The condition on soft lock 'in queue' causes the LBC of the present system to request a passive path until replanning occurs and lock is no longer needed. On the other hand, hard lock is granted for a requested spot (the passage is granted based on the requirements that forklifts cannot go down adjacent passages). In an example, a lock for B may also lock A, C, and N, a lock for C may also lock B, D, (and N maybe). For, multiple forklifts indirectly lock is granted for a given column, however the forklift is be placed 'in queue' if it requests a lock for a column that is already locked by another forklift. For example, forklifts requesting to go to column B and D can do so simultaneously, and both will be indirectly locking column C, but if a forklift is locking column B another forklift will not be granted a direct lock for column C. In an embodiment, indirect locks may specify in metadata which specifies all necessary relations between the columns and the locks. A forklift requesting a direct lock for A will also indirectly lock B and N, and a forklift requesting a direct lock for D will also indirectly lock C. Once a lock is granted, all nodes of the column between the node of the requested action spot and the entrance node are enabled for the duration of the lock.

Embodiments of the present disclosure provides a system and a method to grant a lock request for a column if no forklift (autonomous vehicle) is holding a lock for said column or any adjacent columns. For example, within each region of temporary space, nodes are annotated as entrance nodes if there is an edge of the region connecting the node to outside the region. Based on the annotation, a lock request may be modified to include a destination spot, targeted by a forklift. In one example, device space control of the system (temporary space controller) looks for a path beginning at the requested node and ending at a node connected outside the region of the temp space. A subset of nodes in the path to the destination node is enabled for the duration of the lock. In another embodiment, each region of the temporary space is annotated with a metadata pair. In case of temporary spaces, the distance between the columns or lane determines the validity of a lock. For example, a lock is considered invalid if two regions are locked and the boundaries of the two regions are within predetermined lock area range of each other. Since both regions may have different values of the lock area range, the larger of the two is used to determine validity. The locks are granted for forklifts if they lead to a valid state, and placed in a queue if they lead to an invalid state. Each such region is assigned a metadata field with key 'lock_area_range' and float values determined as 'lock_area_range' of the first lane should be slightly bigger than the width of the second lane, 'lock_area_range' of each other lane should be smaller than the width of any of the lanes. Also, in an example, an auto parallel region is created, for example, enclosing all four lanes of the temp space, so that MRRP allows forklifts to go to nodes within a lock area range of each other as long as they are in the temp space region.

In one embodiment, a first autonomous vehicle/robot holds a lock for the open lane in a temporary space, and second robot is requesting a lock for the bottom lane, then the first robot cannot enter the lane as second in the way and the first cannot escape with a passive route as second is in the way. The problem with the temp space is the same issue as the one or more devices, but more likely as the congestion can be much higher in the area around the temporary space, and robots have more reasons to be in the area (e.g., charge stations in the warehouse). As described earlier, the robots release any hard locks for the respective destination upon receiving a passive path (the robot should maintain soft locks for any regions it is currently occupying). Upon receiving a non-passive route to the destination, the robot reacquires any necessary locks. This solution guarantees that any robots holding a lock are indeed able to enter the corresponding device space. For example, if the robot is unable to enter the device, it may get a passive path and release the lock, giving a chance for other robots to obtain a lock for a different region. This means that if a robot is sitting outside the line control or device is blocking other robots, but is unable to obtain a lock, eventually all blocked robots release their locks, and the robot outside the device can obtain the lock. In another embodiment, region metadata could specify distance thresholds to obtain locks. The robots may obtain locks when it is within the threshold of the region, and release the lock if it is pushed out of that region. By specifying the threshold, the robot comes just outside the temp space before obtaining a lock, which in turn ensures that other robots waiting outside the temp space would obtain a lock.

In various embodiments of FIGS. 1-13, a method and system for autonomous vehicles management in an operating environment is disclosed. The present disclosures solve technical problems in the field related to a plurality of autonomous vehicles operating in a warehouse having multiple floors and including a plurality of devices, device space and area around a device. The various embodiments described herein implement steps to eliminate deadlock, ensuring no waiting time, collaborative operation of autonomous vehicles and collision free route planning.

Embodiments of the present disclosure provides technical solutions to the problem of coordinating and managing multiple heterogeneous robots navigating and picking/dropping items while navigating the passageway of devices, device space or area around a device. Embodiments of the present disclosure also provides an optimal solution to facilitate the task allocation for the forklifts to be synchronized and ensure maximum performance, smooth interaction with other devices like mobile racks, etc., avoid deadlock to ensure no waiting time for robots and collaboration between the multiple robots during entry or exit of the mobile racks within narrow passageways in the warehouse. Embodiments of the present disclosure also provides method and system for safety scenarios which may allow a forklift to temporarily enter into a mobile rack applying the principle of lock enable/release functions, collaborate with the MRRP component of the present system, enabling/disabling the nodes for only those passages that are open or closed. The advantages of having a mobile rack are to utilize space in a warehouse. In such warehouses with mobile racks, there may be narrow passages wherein the robots navigate and make message exchanges or pass next to each other. The system has to perform at least two critical functionalities that may include device control and traffic management. The MRRP component adds some cost penalty for going into the passages due to invoking the different related actions for entering or leaving the racks, however, if there is no option, then the system may allow the robots to enter or leave the racks. In some embodiments, if the forklift is shut down within the mobile rack, then the forklift may be manually exited from the mobile rack. This action may break the chain of autonomous events in the warehouse, as the forklift may still be holding the lock on the mobile rack and has manually moved out. So, whenever the forklift boots back, the LBC running on the forklift verifies the current location. If the current location is not in any of the devices, then, LBC releases all locks that the forklift may have held on the devices. Thereafter, MRRP continues to keep the session active until the forklift arrives at the destination. The system may also use the timeout service to identify cases where lock requests aren't being acknowledged by GBC and may raise an error in such cases.

The present method and system also ensure collaboration between the MRRP and mobile rack controllers and take security precautions to ensure the technique allows multiple robots to navigate, with no deadlocks with robots waiting for each other, etc. The mobile racks cause particular challenges as the robots need to navigate into the passages of these mobile racks, the forklifts need to come out of the passageway, mobile racks need to move to allow the forklifts to enter, etc. The system's functionalities include an overlap of navigation, route planning, and device control. The system is extensible to any device in an operating environment like a warehouse overlapping with the navigation zone of multiple robots.

In one embodiment, the system also avoids circular preconditions that may lead to deadlocks. For example, to avoid the preconditions, the present method and system allows a forklift to ask for a lock on a device that is encountered first in the forklift's navigation path and not for all the other racks that may fall in its navigation path. The system maintains this scenario to ensure that there are no unnecessary locks on all the racks. Before the forklifts make use of the open area of the mobile rack, the system may trigger enter or exit device zone behavior that may be handled in a generic manner. The location where the enter or exit device zone is triggered is considered as a waiting spot that is dynamically generated based on the route being taken by forklift and would be as close to the racks as possible. Also, GWM of the present system stores the device coordinates, passage coordinates, rack coordinates, and passage information that are provided to LBC and GBC when requested.

In one embodiment, if there is a safety hazard in the warehouse in a particular area, the sheet shutter may drop and prevent the fire from spreading into other areas. In some warehouses, the forklift may have to work at night time, so the sheet shutters may be closed at night time. Similar to mobile racks, in case the forklift needs to navigate in those zones, the LBC may request permission to handle the entry or exit from the zones. The sheet shutter may grant the permission and open else deny the permission for the lock. The invention is not limited and includes external devices where the controller node of the devices may be capable of granting or denying lock permissions as part of the system.

Embodiments of the present disclosure also provides solution to the technical problems involving temporary spaces. For example, if one robot is waiting outside a lane (temporary space) without a lock, and another robot is trying to move inside an adjacent lane holding a lock, neither robot may yield to the other. In this case, the robot holding the lock may not release the lock despite being unable to reach the destination, and the robot outside the locked passage may not or cannot move out of the way, thereby creating a deadlock. In another example, if a robot is trying to go to a spot within a lane but near the entrance, and another robot is waiting for a lock outside an adjacent lane, a similar problem may occur. In another example, a nestainer lane (a lane for passage of nestainer in a temporary space) may cause errors due to disabled nodes nearby enabled nodes. Embodiments of the present disclosure provides one or more technical solutions for the aforementioned problems, namely, robots receiving passive routes to release any hard locks for their destination. This guarantees that robots may only hold hard locks for so long as MRRP is guiding towards destination and then release as soon as destination is reached. In another example, a lane up next to an autonomous vehicle (herein referred as robot/forklift) may be added, creating an escape route for robots near the temp space that are given passive paths. In another embodiment where robots may be stuck despite not requesting overlapping goals, in such cases when two or more robots with overlapping destinations, then some of them are rerouted to destinations that are not their final destination, and the MRRP wrapper forces the robots to request passive paths rather than leaving it up to MRRP core. Thus, if one robot is requesting a goal to an enabled spot that is near the entrance of a lane, and another robot is rerouted sitting outside an adjacent lane (and thus in collision with the goal for the first robot), the second robot may get pushed away and guided to a passive path.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. All systems and processes discussed herein may be embodied in program code read from one or more non-transitory computer-readable media. More specific examples (a non-exhaustive list) of the computer-readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. In some embodiments, hard-wired circuitry may be used in place of, or in combination with, program code for implementation of processes according to some embodiments. Embodiments are therefore not limited to any specific combination of hardware and software.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, or any suitable combination of the foregoing.

Computer program code for carrying out operations for aspects of the present disclosure may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS), Platform as a Service (PaaS) or Infrastructure as a Service (IaaS) or Robotics as a Service (RaaS) or Warehouse as a Service (WaaS) or Collaborative robots (cobots) as a Service or other service models. The communication may extend to both wired and wireless communication.

Aspects of the present disclosure are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer-readable medium that when executed can direct a computer, other programmable data processing apparatus, or other devices to function in a particular manner, such that the instructions when stored in the computer-readable medium produce an article of manufacture including instructions which when executed, cause a computer to implement the function/act specified in the flowchart and/or block diagram block or blocks. The computer program instructions may also be loaded onto a computer, other programmable instruction execution apparatus or other devices to cause a series of operational steps to be performed on the computer, other programmable apparatuses or other devices to produce a computer-implemented process such that the instructions which execute on one or more computers or other programmable apparatus provide processes for implementing the functions/acts specified in the flowchart and/or block diagram block or blocks.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented as entirely hardware, entirely software (including firmware, resident software, micro-code, or other suitable types of software) or combining software and hardware implementation that may all generally be referred to herein as a "circuit," "module," "component," or "system" or "platform" or "apparatus.". Furthermore, aspects of the present disclosure may take the form of a computer program product embodied in one or more computer-readable media (e.g., tangible, non-transitory computer-readable media) having computer readable program code embodied thereon. The present disclosure refers to terms like 'users', 'developers', 'designer', 'third parties', 'warehouse owner', 'robotics solutions provider' etc. and is used in several or specific embodiments, however, the terms are not restricted to those specific embodiments and can be replaced by other term(s) as the invention is not restricted or limited by these terms. The present disclosure may be implemented entirely at the server level or in a hybrid manner with software modules (agents) running on the external devices and/or heterogeneous mobile robots at least in a partial manner and in a cloud computing environment. In one embodiment, the invention may be implemented without any need for a server or cloud computing environment and the processing and/or computing capabilities of the agents running on the external device and/or heterogeneous mobile robots may be capable of executing the implementations.

It is to be understood that the above-described embodiments are merely illustrative of numerous and varied other embodiments that may constitute applications of the principles of the invention. Such other embodiments may be readily devised by those skilled in the art without departing from the spirit or scope of this invention and it is our intent they are deemed within the scope of our invention.

The preceding diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

As used in this application, the terms "component", "platform", "module", and "system" are intended to refer to a computer-related entity, either hardware, a combination of software and tangible hardware, software, or software in execution. For example, a component can be but is not limited to, tangible components such as a processor, chip memory, mass storage devices (e.g., optical drives, solid-state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

The terminology used herein is for the purpose of describing particular aspects only and is not intended to be limiting of the disclosure. As used herein, the singular forms "a", "an" and "the" are intended to include the plural forms as well, unless such exclusion is explicitly stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, unless explicitly stated to the contrary, embodiments "comprising," "including," or "having" (or like terms) an element, which has a particular property or a plurality of elements with a particular property, may include additional such elements that do not have the particular property. Furthermore, references to "an embodiment" of the presently described inventive subject matter are not intended to be interpreted as excluding the existence of additional embodiments that also incorporate the recited features.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application and to enable others of ordinary skill in the art to understand the disclosure with various modifications as are suited to the particular use contemplated.

As used herein, the terms "may" and "maybe" indicate a possibility of an occurrence within a set of circumstances; a possession of a specified property, characteristic, or function; and/or qualify another verb by expressing one or more of an ability, capability, or possibility associated with the qualified verb. Accordingly, usage of "may" and "maybe" indicates that a modified term is apparently appropriate, capable, or suitable for an indicated capacity, function, or usage while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "maybe".

As used herein, terms such as "system," "module," "platform, or "component" may include hardware and/or software that operate(s) to perform one or more functions. For example, a system, module, or controller may include one or more computer processors or other logic-based devices that perform operations based on instructions stored on a tangible and non-transitory computer-readable storage medium(s), such as a computer memory. Alternatively, a system, module, or controller may include hard-wired devices that perform operations based on the hard-wired logic of the device. The systems, modules, components, platform, and controllers shown in the figures may represent the hardware that operates based on software or hardwired instructions, the software that directs hardware to perform the operations, or a combination thereof.

It is to be understood that the subject matter described herein is not limited in its application to the details of construction and the arrangement of elements set forth in the description herein or illustrated in the drawings hereof. The subject matter described herein may be combined or interlinked with one or more embodiments to utilize various techniques or components, and form multiple scenarios or use cases that may not be explicitly described here. The subject matter described herein is capable of other embodiments and of being practiced or of being carried out in various ways.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Embodiments described herein are solely for the purpose of illustration. Those in the art will recognize other embodiments that may be practiced with modifications and alterations to those described above.

The invention claimed is:

1. A processor implemented method for navigating into passages of mobile rack units in an operating environment, comprising:
    sending a route plan to an autonomous vehicle in response to a request received from the autonomous vehicle from amongst a plurality of autonomous vehicles in an operating environment comprising one or more mobile rack units and device zones, wherein each mobile rack unit has a plurality of mobile racks with at least one passageway between at least two consecutive mobile racks of the plurality of mobile racks, wherein the route plan comprises navigation segments including a plurality of nodes to follow to reach a destination node, and wherein the device zone is an area around a mobile rack unit;

categorizing the route plan into path segments, the path segments comprising a first path segment including one or more nodes from the plurality of nodes being inside a device zone of the one or more mobile rack units and a second path segment including one or more nodes from the plurality of nodes being outside the device zone of the one or more mobile rack units;

determining a type of path segment from the categorized path segments for each of the node in the navigation segment, wherein the type of determined path segment being the first path segment comprising a first mobile rack unit from the one or more mobile rack units, wherein the first mobile rack unit is mapped to a first node from the one or more nodes of the first path segment, and wherein the first node is assigned a first precondition comprising an action to enter the device zone of the first mobile rack unit;

determining if the destination node is within the device zone of the first mobile rack unit in the first path segment;

annotating the first node of the first path segment with a second precondition based on the determining if the destination node is within the device zone of the first mobile rack unit of a destination node from the one or more nodes, wherein the second precondition comprises performing a hard lock action of the first mobile rack unit for the autonomous vehicle traversing the first path segment to the destination node when it is determined that the destination node is within the device zone of the first mobile rack unit, wherein the hard lock action is permission for the autonomous vehicle to enter the device zone of the first mobile rack unit;

traversing the navigation segments via one or more mobile rack units to reach the destination node; and triggering movement of the first mobile rack unit to open a specific passage of the mobile rack unit for physical access to a mobile rack of the plurality of mobile racks.

2. The method of claim 1, wherein the second precondition comprises performing a soft lock action of the first mobile rack unit for the autonomous vehicle traversing the first path segment via the one or more mobile rack units when it is determined that the destination node is not within the device zone of the first device, and wherein the soft lock action is permission for the autonomous vehicle to traverse the device zone of the first mobile rack unit.

3. The method of claim 1, further comprising:
determining a type of path segment from the categorized path segments for each of the node, wherein the type of determined path segment being the first path segment comprising a second mobile rack unit from the one or more mobile rack units, wherein the second mobile rack unit is mapped to a second node from the one or more nodes of the first path segment, and wherein the second node is assigned a first precondition comprising an action to enter the device zone of the second mobile rack unit.

4. The method of claim 1, further comprising:
determining a type of path segment from the categorized path segments for each of the node in the navigation segment, wherein the type of determined path segment being the second path segment comprising a previous mobile rack unit and a next mobile rack unit from the one or more mobile rack units, wherein the previous mobile rack unit is mapped to a first node and the next mobile rack unit is mapped to a last node of the second path segment, wherein the first node is annotated with a first precondition comprising an action to exit device zone of the previous mobile rack unit and an unlock action to unlock locks for of the previous mobile rack unit is initiated, and where the last node is annotated with an action comprising enter device zone of the next mobile rack unit; and annotating the first node of the second path segment with a second precondition based on determination of a destination node, wherein the second precondition comprises performing a hard lock action of the next mobile rack unit for the autonomous vehicle traversing the second path segment to the destination node.

5. The method of claim 4, further comprising:
annotating the first node of the second path segment with a second precondition based on determining of the destination node from the one or more nodes, wherein the second precondition comprises performing the soft lock action of the next mobile rack unit for the autonomous vehicle traversing the second path segment via the one or more mobile rack units.

6. The method of claim 4, further comprising:
determining a type of path segment, for each of the node traversing to the destination node from the categorized path segments, wherein the type of determined path segment being the second path segment comprising a second mobile rack unit from the one or more mobile rack units, wherein the second mobile rack unit is mapped to a second node from the one or more nodes of the second path segment, wherein the second node is assigned a first precondition comprising an action to enter the device zone of the second mobile rack unit.

7. The method of claim 1, further comprising:
initiating the annotated action on the first node by the autonomous vehicle traversing via the type of determined path segment;

satisfying the first precondition on the first node to traverse to next node in the type of determined path segment; and completing the annotated action on satisfying the first precondition, wherein the completing of annotated action updates the type of determined path segment to traverse to the destination node.

8. The method of claim 7, wherein satisfying the first precondition on the first node comprises an action to be completed by the autonomous vehicle traversing the type of determined path segment to reach the destination node.

9. The method of claim 1, further comprising:
initiating a passive path request based on a task assigned to the autonomous vehicle, wherein the passive path request is approved based on priority of the task assigned to the autonomous vehicles.

10. The method of claim 9, further comprising:
releasing a hard lock action by the one or more autonomous vehicles upon receiving a passive path request; and re-acquiring the released hard lock by the one or more autonomous vehicles upon receiving a non-passive route request to the destination node.

11. A system comprising:
a memory storing instructions;
a processor coupled to the memory, wherein the processor is configured by the instructions to:

send a route plan to an autonomous vehicle in response to a request received from the autonomous vehicle from amongst a plurality of autonomous vehicles in an operating environment comprising one or more mobile rack units and device zones, wherein each mobile rack unit has a plurality of mobile racks with at least one passageway between at least two consecutive mobile racks of the plurality of mobile racks, wherein the route plan comprises navigation segments including a plurality of nodes to follow to reach a destination node, and wherein the device zone is an area around a mobile rack unit;

categorize the route plan into path segments, the path segments comprising a first path segment including one or more nodes from the plurality of nodes being inside a device zone of the one or more mobile rack units and a second path segment including one or more nodes from the plurality of nodes being outside the device zone of the one or more mobile rack units;

determine a type of path segment from the categorized path segments for each of the node in the navigation segment, wherein the type of determined path segment being the first path segment comprising a first mobile rack unit from the one or more mobile rack units, wherein the first mobile rack unit is mapped to a first node from the one or more nodes of the first path segment, and wherein the first node is assigned a first precondition comprising an action to enter the device zone of the first mobile rack unit;

determine if the destination node is within the device zone of the first mobile rack unit in the first path segment;

annotate the first node of the first path segment with a second precondition based on the determining if the destination node is within the device zone of the first mobile rack unit of a destination node, wherein the second precondition comprises performing a hard lock action of the first mobile rack unit for the autonomous vehicle traversing the first path segment to the destination node when it is determined that the destination node is within the device zone of the first mobile rack unit, wherein the hard lock action is permission for the autonomous vehicle to enter the device zone of the first mobile rack unit;

traverse the navigation segments via one or more mobile rack units to reach the destination node; and trigger movement of the first mobile rack unit to open a specific passage of the mobile rack unit for physical access to a mobile rack of the plurality of mobile racks.

12. The system of claim 11, wherein the second precondition comprises performing a soft lock action for the first mobile rack unit of the autonomous vehicle traversing the first path segment via the one or more mobile rack units when it is determined that the destination node is not within the device zone of the first device, and wherein the soft lock action is permission for the autonomous vehicle to traverse the device zone of the first device.

13. The system of claim 11, further configured to:

determine a type of path segment from the categorized path segments for each of the node, wherein the type of determined path segment being the first path segment comprising a second mobile rack unit from the one or more mobile rack units, wherein the second mobile rack unit is mapped to a second node from the one or more nodes of the first path segment, and wherein the second node is assigned a first precondition comprising an action to enter the device zone of the second device.

14. The system of claim 11, further configured to:

determine a type of path segment from the categorized path segments for each of the node in the navigation segment, wherein the type of determined path segment being the second path segment comprising a previous mobile rack unit and a next mobile rack unit from the one or more mobile rack units, wherein the previous mobile rack unit is mapped to a first node and the next device is mapped to a last node of the second path segment, wherein the first node is annotated with a first precondition comprising an action to exit device zone and an unlock action for locked mobile rack units in the second path segment, and where the last node is annotated with an action comprising enter device zone; and annotate the first node of the second path segment with a second precondition based on determination of a destination node, wherein the second precondition comprises performing a hard lock action of the next mobile rack unit for the autonomous vehicle traversing the second path segment to the destination node.

15. The system of claim 14, further configured to:

annotate the first node with a second precondition based on determination of a destination node, wherein the second precondition comprises performing a soft lock action for the next mobile rack unit of the autonomous vehicle traversing the second path segment via the one or more mobile rack units.

16. The system of claim 14, further configured to:

determine a type of path segment, for each of the node traversing to the destination node, from the categorized path segments, wherein the type of determined path segment being the second path segment comprising a second mobile rack unit from the one or more mobile rack units, wherein the second mobile rack unit is mapped to a second node from the one or more nodes of the second path segment, wherein the second node is assigned a first precondition comprising an action to enter the device zone of the second mobile rack unit.

17. The system of claim 11, further configured to:

initiate the annotated action on the first node by the autonomous vehicle traversing via the type of determined path segment;

satisfy the first precondition on the first node to traverse to next node in the type of determined path segment; and complete the annotated action on satisfying the first precondition, wherein the completing of annotated action updates the type of determined path segment to traverse to the destination node.

18. The system of claim 17, wherein satisfying the first precondition on the first node comprises an action to be completed by the autonomous vehicles traversing the type of determined path segment to reach the destination node.

19. A non-transitory computer-readable medium having embodied thereon a computer program comprising a method for navigating into passages of mobile racks units in an operating environment, the method comprising:

sending a route plan to an autonomous vehicle in response to a navigation request received from the autonomous vehicle from amongst a plurality of autonomous vehicles in an operating environment comprising one or more mobile rack units, wherein each mobile rack unit has a plurality of mobile racks with at least one passageway between at least two consecutive racks of the plurality of mobile racks, wherein the route plan comprises navigation segments having a plurality of nodes to follow to reach a destination node, and wherein the device zone is an area around a mobile rack unit, and wherein the device zone is an area around a mobile rack unit;

categorizing the route plan into path segments, the path segments comprising a first path segment including one or more nodes from the plurality of nodes being inside a device zone of the one or more mobile rack units and a second path segment including one or more nodes from the plurality of nodes being outside the device zone of the one or more mobile rack units;

determining a type of path segment from the categorized path segments for each of the node in the navigation segment, wherein the type of determined path segment being the first path segment comprising a first mobile rack unit from the one or more mobile rack units, wherein the first mobile rack unit is mapped to a first node from the one or more nodes of the first path segment, and wherein the first node is assigned a first precondition comprising an action to enter the device zone of the first mobile rack unit;

determining if the destination node is within the device zone of the first mobile rack unit in the first path segment;

annotating the first node of the first path segment with a second precondition based on the determining if the destination node is within the device zone of the first mobile rack unit, wherein the second precondition comprises performing one of: a hard lock action and a soft lock action of the first mobile rack unit for the autonomous vehicle traversing the first path segment to the destination node, wherein the hard lock action is permission for the autonomous vehicle to enter the device zone of the first mobile rack unit;

traversing the navigation segments via one or more mobile rack units to reach the destination node; and triggering movement of the first mobile rack unit to open a specific passage of the mobile rack unit for physical access to a mobile rack of the plurality of mobile racks.

20. The non-transitory computer-readable medium of claim 19, wherein the second precondition comprises performing a soft lock action for the first mobile rack unit of the autonomous vehicle traversing the first path segment via the one or more mobile rack units when it is determined that the destination node is not within the device zone of the first device, and wherein the soft lock action is permission for the autonomous vehicle to traverse the device zone of the first device.

21. The method of claim 1, wherein triggering the movement of the first mobile rack unit comprises:

receiving an intent to pass through the device zone of the first mobile rack unit on reaching the first mobile rack unit, wherein the intent comprises a request for one of: the hard lock and the soft lock of the first mobile rack unit; and determining whether any actuation of the mobile rack unit is required to open a specific passage for physical access to a mobile rack of the first mobile rack unit before granting one of: the hard lock and the soft lock; and enabling or disabling at least one node of the one or more nodes of the first path segment based on the actuation of the mobile rack unit.

* * * * *